United States Patent
Youtong et al.

(10) Patent No.: US 12,266,992 B2
(45) Date of Patent: Apr. 1, 2025

(54) ELECTROMAGNETIC PUMP

(71) Applicant: Zhejiang University, Hangzhou (CN)

(72) Inventors: Fang Youtong, Hangzhou (CN); Ma Jien, Hangzhou (CN); Wu Wenxiao, Hangzhou (CN); Qiu Lin, Hangzhou (CN); Wu Lijian, Hangzhou (CN); Wang Dong, Hangzhou (CN); Zhang Jian, Hangzhou (CN); Xu Bowen, Hangzhou (CN)

(73) Assignee: Zhejiang University, Hangzhou (CN)

( * ) Notice: Subject to any disclaimer, the term of this patent is extended or adjusted under 35 U.S.C. 154(b) by 246 days.

(21) Appl. No.: 18/084,880

(22) Filed: Dec. 20, 2022

(65) Prior Publication Data

US 2023/0361667 A1 Nov. 9, 2023

(30) Foreign Application Priority Data

May 9, 2022 (CN) .......................... 202210499017.0

(51) Int. Cl.
*H02K 44/06* (2006.01)
*F04B 15/04* (2006.01)
*F04B 17/03* (2006.01)

(52) U.S. Cl.
CPC .............. *H02K 44/06* (2013.01); *F04B 15/04* (2013.01); *F04B 17/03* (2013.01); *H02K 2213/03* (2013.01)

(58) Field of Classification Search
CPC .... H02K 44/06; H02K 2213/03; F04B 15/04; F04B 17/03
See application file for complete search history.

(56) References Cited

U.S. PATENT DOCUMENTS

| | | | | |
|---|---|---|---|---|
| 4,166,714 A | * | 9/1979 | Rienass | H02K 44/06 417/50 |
| 4,212,592 A | * | 7/1980 | Olich | H02K 44/06 417/50 |
| 4,773,826 A | * | 9/1988 | Mole | G21C 15/247 976/DIG. 201 |
| 5,277,551 A | * | 1/1994 | Slepian | H02K 44/06 417/244 |
| 5,642,011 A | * | 6/1997 | Fanning | H02K 1/12 310/216.061 |
| 2015/0069680 A1 | * | 3/2015 | Kuri | C21D 1/63 266/241 |

* cited by examiner

*Primary Examiner* — Charles G Freay
(74) *Attorney, Agent, or Firm* — LADAS & PARRY LLLP

(57) ABSTRACT

Disclosed in the present invention is an electromagnetic pump, including: a pump body; an inner iron core, including a central cylinder, an axis of the central cylinder basically coinciding with an axis of the electromagnetic pump; a plurality of outer iron cores, disposed at least partially surrounding the inner iron core; a winding, at least partially disposed on the outer iron cores; and a pump channel mechanism, at least partially disposed between the outer iron cores and the inner iron core, where the pump channel mechanism includes: a first pump channel wall, a second pump channel wall, a circulation channel, and a cavity dividing structure, and being used for supporting the first pump channel wall and the second pump channel wall, the cavity dividing structure being further used for dividing the circulation channel, to divide the circulation channel into a plurality of channels.

20 Claims, 19 Drawing Sheets

ELECTROMAGNETIC PUMP

CROSS-REFERENCE TO RELATED APPLICATIONS

This application claims priority to Chinese Application 202210499017.0 filed May 9, 2022. The aforementioned patent application is incorporated herein by reference in their entirety.

TECHNICAL FIELD

The present invention relates to the field of electromagnetic pumps, and in particular, to an induction electromagnetic pump.

BACKGROUND

In the prior technology, due to the problem of a penetration depth of a magnetic field, an inner iron core is disposed to improve the penetration depth of magnetic field lines, so that a pump channel is completely in a magnetic field, thereby increasing the output of an electromagnetic pump and improving the use efficiency of the electromagnetic pump. However, during operations under high-frequency conditions, inner and outer iron cores of the electromagnetic pump generate circumferential eddy currents, resulting in a great eddy current loss and pump body heating, which affects the flow characteristics of a metal fluid, making fluid analysis complex. In more serious cases, the efficiency of the electromagnetic pump is reduced, the temperature rise is increased, the system instability is increased, and more stringent requirements are imposed for insulation, cooling and other conditions.

In a conventional cylindrical electromagnetic pump structure, a cylindrical (or ring-shaped) structure is used for an inner iron core. With the intensification of market competition, a design is inevitably required to reduce the manufacturing cost of the electromagnetic pump, reduce the system loss, and improve the efficiency. An inner iron core in an existing electromagnetic pump has a large radius, consumes a large amount of manufacturing material to cause a high cost, and suffers from an eddy current loss. A solid structure also makes it more difficult to design a heat dissipation structure.

SUMMARY

To resolve the deficiencies in the prior art, an objective of the present invention is to provide an electromagnetic pump that can reduce the circulation of liquid metal.

To achieve the foregoing objective, the following technical solution is adopted in the present invention:

An electromagnetic pump includes: a pump body, an accommodating space being formed in the pump body; an inner iron core, the inner iron core being at least partially disposed in the accommodating space and including a central cylinder, an axis of the central cylinder basically coinciding with an axis of the electromagnetic pump; a plurality of outer iron cores, the plurality of outer iron cores being disposed at least partially surrounding the inner iron core; a winding, the winding being at least partially disposed on the outer iron cores; and a pump channel mechanism, the pump channel mechanism being at least partially disposed between the outer iron cores and the inner iron core, where the pump channel mechanism includes: a first pump channel wall, the first pump channel wall being disposed between the outer iron cores and the inner iron core; a second pump channel wall, the second pump channel wall being disposed between the first pump channel wall and the inner iron core; a circulation channel, the circulation channel being disposed between the first pump channel wall and the second pump channel wall; and a cavity dividing structure, the cavity dividing structure being disposed between the first pump channel wall and the second pump channel wall and being used for supporting the first pump channel wall and the second pump channel wall, the cavity dividing structure being further used for dividing the circulation channel, to divide the circulation channel into a plurality of channels, the cavity dividing structure including a first cavity dividing member and/or a second cavity dividing member and/or a third cavity dividing member, a cross section of the first cavity dividing member being a first cross section, the first cross section being basically a first trapezoid, a length of a longer bottom of the first cross section being $$L_1, L_1 > \frac{2\pi(r + d_1 + d_2 + h)}{360} \times 2\theta,$$

where r is a radius of the inner iron core, $d_1$ is a thickness of the second pump channel wall, $d_2$ is a thickness of the second protective layer, h is a width of the circulation channel, $$\theta > \frac{1}{2}\left(\frac{360}{n} - \alpha\right)$$

is a quantity of the cavity dividing structures, and $\alpha$ is a half of a radian corresponding to $L_1$.

Further, one end of the cavity dividing structure is connected to or abuts against the first pump channel wall, and the other end of the cavity dividing structure is connected to or abuts against the second pump channel wall.

Further, the pump channel mechanism further includes a first protective layer and a second protective layer; and the first protective layer is disposed between the first pump channel wall and the outer iron cores, and the second protective layer is disposed between the second pump channel wall and the inner iron core.

Further, a length of a shorter bottom of the first cross section is $L_2$, and $$L_2 > \frac{2\pi(r + d_1 + d_2)}{360} \times 2\theta.$$

Further, a cross section of the second cavity dividing member is a second cross section, the second cross section is basically a rectangle, a side length by which the second cross section is connected to or abuts against the first pump channel wall is $L_1$, and a side length by which the second cross section is connected to or abuts against the second pump channel wall is also $L_1$.

Further, a cross section of the third cavity dividing member is a third cross section, the third cross section is basically formed by splicing two second trapezoids, shorter bottoms of the two second trapezoids are spliced, a longer side of one second trapezoid is connected to or abuts against the first pump channel wall, and a longer side of the other second trapezoid is connected to or abuts against the second pump channel wall.

Further, a length of the longer bottom of each second trapezoid is $L_1$, a length of the shorter bottom of each second trapezoid is $L_3$, and $$L_3 > \frac{2\pi(r + d_1 + d_2 + 0.5h)}{360} \times 2\theta.$$

Further, in a case that the electromagnetic pump has been continuously operating for 30 days, a mass change of the cavity dividing structure is less than or equal to 0.05%; and at a temperature of 500° C., a volume change of the cavity dividing structure is less than or equal to 1%.

Further, the cavity dividing structure is made of a molybdenum alloy.

Further, the pump channel mechanism at least partially extends in an axial direction of the electromagnetic pump; and the electromagnetic pump further includes a support assembly, one end of the support assembly is connected to or abuts against the central cylinder, and the other end of the support assembly is connected to or abuts against an extended part of the pump channel mechanism.

Further, the pump channel mechanism further includes a first protective layer and the second protective layer, and the first protective layer, the first pump channel wall, the second pump channel wall, and the second protective layer are arranged from outside to inside.

Further, the support assembly is made of ceramic.

Further, the support assembly includes a first support member, one end of the first support member is connected to or abuts against the central cylinder, and the other end of the first support member passes through the second protective layer and the second pump channel wall to be connected to or abut against the first pump channel wall.

Further, the first support member is basically disposed surrounding the central cylinder.

Further, a plurality of second through holes are provided in the second protective layer, a plurality of third through holes are provided in the second pump channel wall, and one end of the first support member passes through the second through holes and the third through holes to be connected to or abut against the first pump channel wall.

Further, a quantity of the second through holes, a quantity of the third through holes, and a quantity of the first support members are consistent; and positions of the second through holes and positions of the third through holes are basically consistent.

Further, the first support member and the second through holes are in interference fit, and the first support member and the third through holes are in interference fit.

Further, the first pump channel wall and the second pump channel wall extend in the axial direction of the electromagnetic pump, and the first protective layer and/or the second protective layer extends in the axial direction of the electromagnetic pump.

Further, the first pump channel wall and the second pump channel wall extend in the axial direction of the electromagnetic pump.

Further, the support assembly further includes a second support member, one end of the second support member is connected to or abuts against the central cylinder, and the other end of the second support member is connected to or abuts against the second protective layer.

Further, the second support member is basically disposed surrounding the central cylinder.

Further, the second pump channel wall extends in the axial direction of the electromagnetic pump, and the first pump channel wall and/or the first protective layer and/or the second protective layer extends in the axial direction of the electromagnetic pump.

Further, the second pump channel wall extends in the axial direction of the electromagnetic pump.

Further, the support assembly further includes a third support member, one end of the third support member is connected to or abuts against the central cylinder, and the other end of the third support member is connected to or abuts against the first pump channel wall.

Further, the third support member is basically disposed surrounding the central cylinder.

Further, the first pump channel wall and the first protective layer both extend in the axial direction of the electromagnetic pump.

Further, the first pump channel wall extends in the axial direction of the electromagnetic pump.

Compared with the prior art, for the electromagnetic pump provided in the present invention, the cavity dividing structure may block the movement of liquid metal moving in a second direction, thereby reducing the circulation of liquid metal in the pump channel mechanism, thereby improving the flow rate and efficiency of the electromagnetic pump.

DETAILED DESCRIPTION

To enable a person skilled in the art to better understand the solutions in the present invention, the following clearly and completely describes technical solutions in embodiments of the present invention with reference to the accompanying drawings in the specific embodiments of the present invention.

Figure 1:
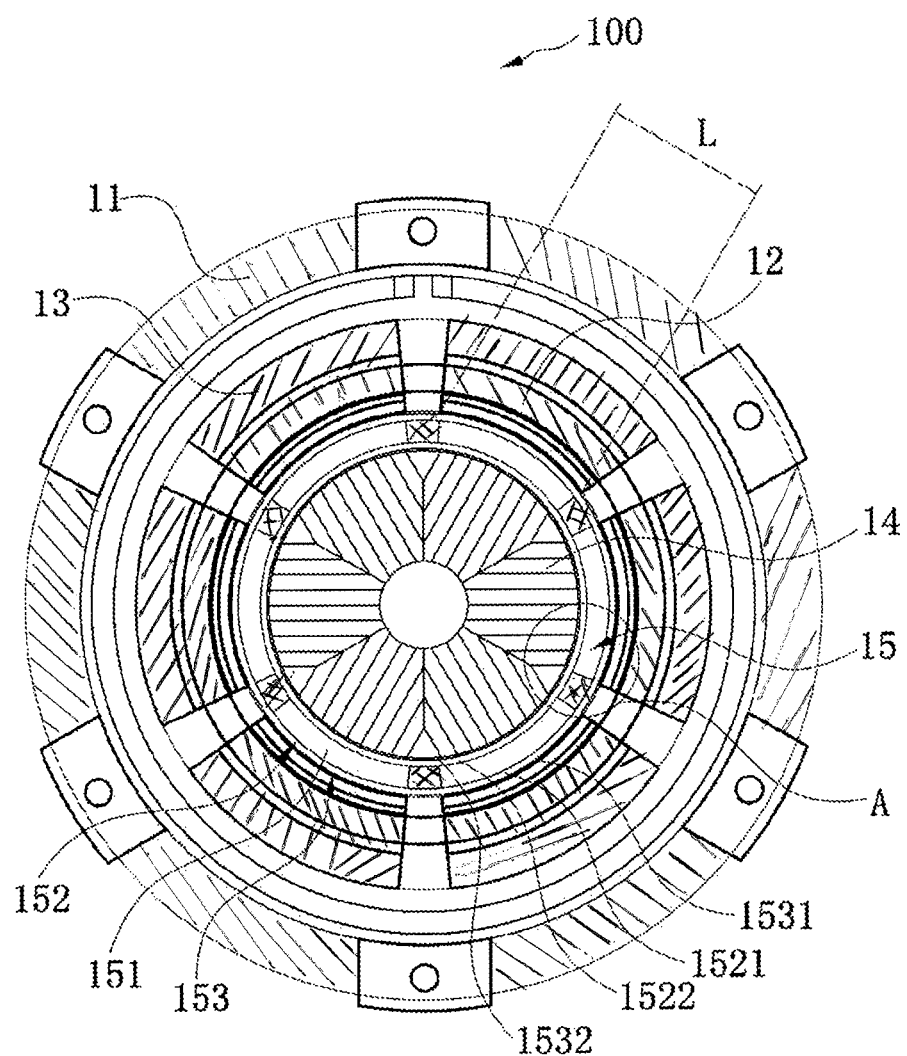
FIG. 1 is a first schematic structural diagram of an electromagnetic pump according to the present invention.

As shown in FIG. 1, an electromagnetic pump 100 includes a pump body 11, a winding 12, a plurality of outer iron cores 13, an inner iron core 14, and a pump channel mechanism 15. A first accommodating space is formed in the pump body 11. The winding 12 is at least partially disposed in the first accommodating space. The winding 12 is at least partially disposed on the outer iron cores 13 and is used for transferring a current. The plurality of outer iron cores 13 are at least partially disposed in the first accommodating space. The inner iron core 14 is also at least partially disposed in the first accommodating space. The plurality of outer iron cores 13 are all disposed at least partially surrounding the inner iron core 14, so that a magnetic field is generated between the outer iron cores 13 and the inner iron core 14 through a current in the winding 12, to implement electromagnetic induction. The pump channel mechanism 15 is at least partially disposed in the first accommodating space and at least partially disposed between the outer iron cores 13 and the inner iron core 14, and is used as a channel for liquid metal to flow through. Specifically, after the winding 12 is energized, the magnetic field generated between the outer iron cores 13 and the inner iron core 14 acts on the liquid metal in the pump channel mechanism 15 to generate an induced current. The liquid metal in the pump channel mechanism 15 becomes a current carrying conductor, so that the liquid metal and the magnetic field interact to generate an electromagnetic force to drive the liquid metal to move in a fixed direction.

Figure 2:
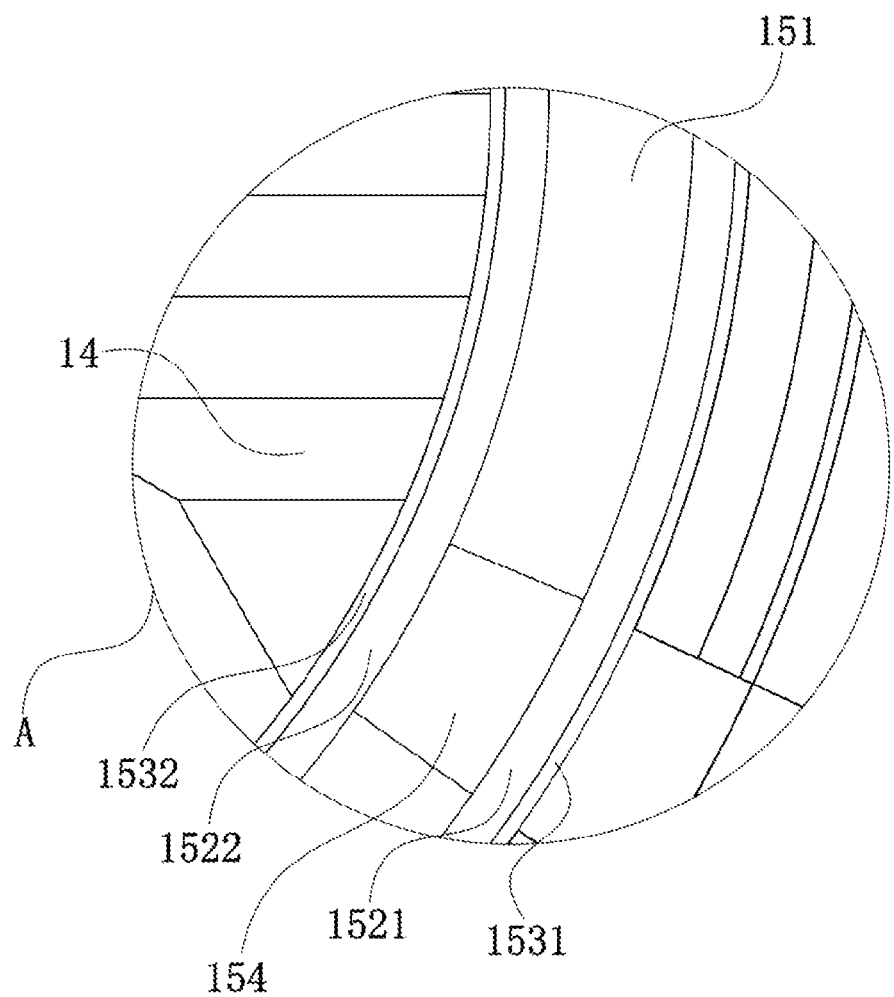
FIG. 2 is a partial enlarged view of A in FIG. 1 according to the present invention.

As shown in FIG. 1 and FIG. 2, in an embodiment, the pump channel mechanism 15 includes a circulation channel 151, a pump channel wall 152, and a protective layer 153. The pump channel wall 152 includes a first pump channel wall 1521 and a second pump channel wall 1522. The circulation channel 151 is disposed between the first pump channel wall 1521 and the second pump channel wall 1522. A gap between the first pump channel wall 1521 and the second pump channel wall 1522 is the circulation channel 151. The protective layer 153 includes a first protective layer 1531 and a second protective layer 1532 and is used for improving the strength of the pump channel wall 152, to fix the shape of the circulation channel 151 to facilitate the flow of liquid metal. The pump channel wall 152 is disposed between the first protective layer 1531 and the second protective layer 1532, and the circulation channel 151 is disposed between the first protective layer 1531 and the second protective layer 1532. Specifically, the first protective layer 1531 is disposed between the outer iron cores 13 and the first pump channel wall 1521, and the second protective layer 1532 is disposed between the inner iron core 14 and the second pump channel wall 1522. That is, the outer iron cores 13, the first protective layer 1531, the first pump channel wall 1521, the circulation channel 151, the second pump channel wall 1522, and the second protective layer 1532 are sequentially arranged from outside to inside.

In this embodiment, the pump channel wall 152 may be made of ceramic. That is, the pump channel wall 152 may be silicon nitride ceramic. Because the silicon nitride ceramic has stable properties and is magnetically non-conductive, electrically non-conductive, and corrosion resistant, so that the pump channel wall 152 may have adequate corrosion resistance and high strength. The protective layer 153 may be made of carbon fiber, to ensure that the pump channel wall 152 may have certain ductability, so that after a temperature changes, the thermal expansion and contraction problem of the pump channel mechanism 15 is solved. In this way, the tenacity of the pump channel mechanism 15 can be improved, and the safety of the electromagnetic pump 100 can be improved.

As shown in FIG. 1, in an embodiment, the plurality of outer iron cores 13 are disposed at least partially surrounding the inner iron core 14. An end of each of the plurality of outer iron cores 13 close to the pump channel mechanism 15 is a first end, an end surface of the first end is a first arc surface, and the first arc surface has a first arc shape. With the foregoing arrangement, a pole arc area that can be provided by the first end is greater than a pole arc area provided by the first end being a plane, so that the pole arc area of the first end can be increased, and the circulation of liquid metal in the pump channel mechanism 15 can be reduced, thereby improving the flow rate and efficiency of the electromagnetic pump 100. Specifically, the first arc surfaces of the plurality of outer iron cores 13 jointly form a cylindrical space, and a cross section of the cylindrical space is a first circle. The center of the first circle basically coincides with the center of the inner iron core 14, thereby implementing the concentricity of the electromagnetic pump 100, so that a possibility that single-sided magnetic pressure occurs can be effectively reduced. In this embodiment, the outer iron cores 13 may be made of silicon steel, to implement most effective energy exchange between electrical energy and magnetic energy.

In this embodiment, the first pump channel wall 1521 and the second pump channel wall 1522 have basically a consistent thickness being $d_1$, and the first protective layer 1531 and the second protective layer 1532 have basically a consistent thickness being $d_2$. The inner iron core 14 is basically a cylinder, and a radius of the inner iron core 14 is r. A cross section of the circulation channel 151 is basically ring-shaped, and the center of the cross section of the circulation channel 151 basically coincides with the center of a cross section of the inner iron core 14, thereby implementing the concentricity of the electromagnetic pump 100, so that a possibility that single-sided magnetic pressure occurs can be effectively reduced. The width of the circulation channel 151 is h, and h refers to a distance between an outer ring and an inner ring of the circulation channel 151 in a radius direction of the ring. The center of the cross section of the cylindrical space formed by the plurality of outer iron cores 13, that is, the first circle, basically coincides with the center of the cross section of the inner iron core 14, thereby implementing the concentricity of the electromagnetic pump 100, so that a possibility that single-sided magnetic pressure occurs can be effectively reduced. In a radius direction of the first circle, a distance between the first circle and an outer side wall of the first protective layer 1531 is δ. The first circle has a first radius $R_1$, and the outer iron cores 13 are basically disposed symmetrically with respect to the first radius $R_1$. The width of each outer iron core 13 is L. L refers to a width perpendicular to the direction of the first radius $R_1$. Specifically, L refers to a distance between two end points of the outer iron core 13 close to the pump channel mechanism 15. It may be obtained through the Pythagorean theorem that:

$$\alpha = 2\arcsin\left(\frac{0.5L}{r + h + 2d_1 + 2d_2 + \delta}\right).$$

As can be seen from the foregoing formula, the angle subtended by the first arc surface of the outer iron core 13 is 2α.

In an embodiment, the center of the first circle is connected to one end of the first arc shape to form a first straight line, and the center of the first circle is connected to the other end of the first arc shape to form a second straight line. Areas defined by the first arc shape, the first straight line, and the second straight line are first areas S1. specifically, a quantity of the outer iron cores 13 is consistent with a quantity of the first areas S1, and both the quantity of the outer iron cores 13 and the quantity of the first areas S1 may be adjusted according to an actual requirement. A second area S2 is formed between two adjacent first areas S1. An overlapping portion between the first area S1 and the circulation channel 151 is a third area S3, and an overlapping portion between the second area S2 and the circulation channel 151 is a fourth area S4. In this embodiment, the third area S3 extends in an axial direction of the electromagnetic pump 100 to divide the circulation channel 151 to obtain a first region, and the fourth area S4 extends in the axial direction of the electromagnetic pump 100 to divide the circulation channel 151 to obtain a second region.

During the operation of the electromagnetic pump 100, when magnetic field lines of a magnetic field generated through electromagnetic induction enter the inner iron core 14 from the outer iron cores 13 or enter the outer iron cores 13 from the inner iron core 14, the magnetic field lines basically completely pass through the first region. In this case, the magnetic induction intensity in the first region is large, and the magnetic induction intensity in the first region is greater than the magnetic induction intensity in the second region. Therefore, liquid metal in the first region moves in a first direction and flows fast, and liquid metal in the second region moves in a second direction and flows slow. The first direction and the second direction are basically radius directions of the first circle, and the first direction and the second direction are basically opposite. According to the continuity principle of fluids, the liquid metal moving in the first direction forms a circulation and meets the liquid metal moving in the second direction. As a result, the flow rate and efficiency of the electromagnetic pump 100 are greatly reduced.

As shown in FIG. 2, in this embodiment, the pump channel mechanism 15 further includes a plurality of cavity dividing structures 154. The cavity dividing structures 154 are at least partially disposed between the first pump channel wall 1521 and the second pump channel wall 1522. One end of each cavity dividing structure 154 is connected to or abuts against the first pump channel wall 1521, and the other end of the cavity dividing structure 154 is connected to or abuts against the second pump channel wall 1522, or the other end of the cavity dividing structure 154 may be connected to the inner iron core 14. The cavity dividing structures 154 are used for dividing the circulation channel 151 into a plurality of channels, and are used for supporting the first pump channel wall 1521 and the second pump channel wall 1522, to keep the stability of the circulation channel 151, thereby improving the stability of the electromagnetic pump 100. A quantity of the cavity dividing structures 154 is consistent with the quantity of the outer iron cores 13. Specifically, an area of a cross section of each cavity dividing structure 154 is greater than or equal to the fourth area, and the cross section of the cavity dividing structure 154 basically completely covers the fourth area. Through the foregoing arrangement, the cavity dividing structure 154 may block the movement of liquid metal moving in a second direction, thereby reducing the circulation of liquid metal in the pump channel mechanism 15, thereby improving the flow rate and efficiency of the electromagnetic pump 100. The cavity dividing structure 154 has good electrical conductivity, corrosion resistance, and high temperature resistance. For example, the cavity dividing structure 154 may be made of a molybdenum alloy, so that the corrosion resistance and strength can be improved. The good high temperature resistance of the cavity dividing structure 154 refers to that at a temperature of 500° C., a volume change of the cavity dividing structure 154 is less than or equal to 1%. The good corrosion resistance of the cavity dividing structure 154 refers to that in a case that the electromagnetic pump 100 has been continuously operating for 30 days, a mass change of the cavity dividing structure 154 is less than or equal to 0.05%.

Figure 3:
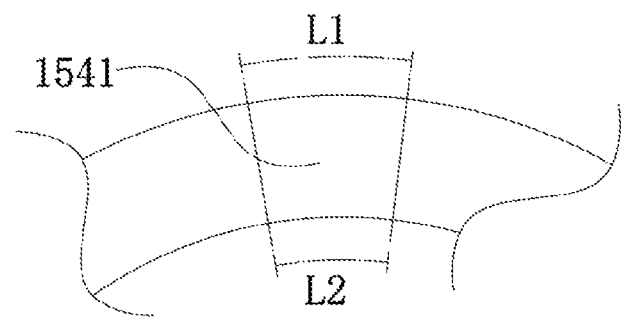
FIG. 3 is a first schematic structural diagram of a cavity dividing structure according to the present invention.
Figure 4:
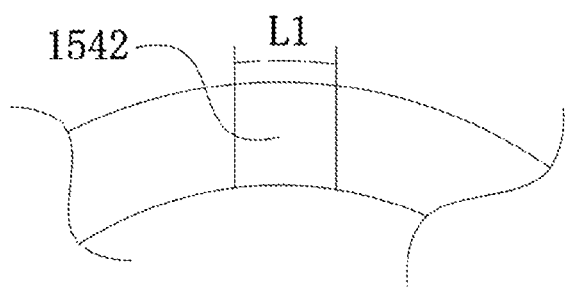
FIG. 4 is a second schematic structural diagram of a cavity dividing structure according to the present invention.
Figure 5:
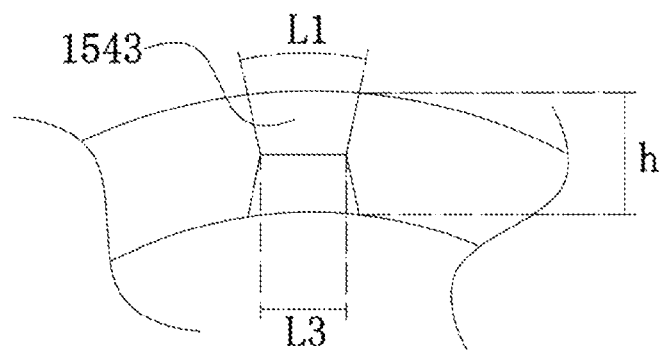
FIG. 5 is a third schematic structural diagram of a cavity dividing structure according to the present invention.

As shown in FIG. 3, FIG. 4, and FIG. 5, in an embodiment, the cavity dividing structure 154 includes a first cavity dividing member 1541 and/or a second cavity dividing member 1542 and/or a third cavity dividing member 1543. The first cavity dividing member 1541 is disposed between the first pump channel wall 1521 and the second pump channel wall 1522. One end of the first cavity dividing member 1541 is connected to or abuts against the first pump channel wall 1521, and the other end of the first cavity dividing member 1541 is connected to or abuts against the second pump channel wall 1522. The second cavity dividing member 1542 is disposed between the first pump channel wall 1521 and the second pump channel wall 1522. One end of the second cavity dividing member 1542 is connected to or abuts against the first pump channel wall 1521, and the other end of the second cavity dividing member 1542 is connected to or abuts against the second pump channel wall 1522. The third cavity dividing member 1543 is disposed between the first pump channel wall 1521 and the second pump channel wall 1522. One end of the third cavity dividing member 1543 is connected to or abuts against the first pump channel wall 1521, and the other end of the third cavity dividing member 1543 is connected to or abuts against the second pump channel wall 1522. Specifically, a cross section of the first cavity dividing member 1541 is a first cross section. The shape of the first cross section is basically a first trapezoid. A longer bottom of the first cross section is connected to or abuts against the first pump channel wall 1521, and a shorter bottom of the first cross section is connected to or abuts against the second pump channel wall 1522. A cross section of the second cavity dividing member 1542 is a second cross section. The shape of the second cross section is basically a rectangle. A cross section of the third cavity dividing member 1543 is a third cross section. The shape of the third cross section is basically formed by splicing two second trapezoids. Shorter bottoms of the two second trapezoids are spliced. A longer bottom of one second trapezoid is connected to or abuts against the first pump channel wall 1521, and a longer bottom of the other second trapezoid is connected to or abuts against the second pump channel wall 1522.

In this embodiment, both the first pump channel wall 1521 and the second pump channel wall 1522 are arc-shaped surfaces. Therefore, a longer bottom of the first cross section is also arc-shaped and has an arc length of $L_1$, and a shorter bottom of the first cross section is also arc-shaped and has an arc length of $L_2$; a side length by which the second cross section is connected to the pump channel wall 152 is also arc-shaped and has an arc length of $L_1$; and a longer bottom of the third cross section is also arc-shaped and has an arc length of $L_1$, and a shorter bottom of the third cross section is a straight side and has a length of $L_3$. The width of the circulation channel 151 is h, the height of the first cross section is also basically h, the height of the second cross section is also basically h, and the height of the third cross section is also basically h. Each of two sides of each trapezoid of the first cross section and the third cross section forms an angle θ with the height of the trapezoid, and $$\theta > \frac{1}{2}\left(\frac{360}{n} - \alpha\right).$$

n is the quantity of the cavity dividing structures 154. The quantity of the cavity dividing structures 154 is consistent with the quantity of the outer iron cores 13.

Specifically, $L_1$, $L_2$, and $L_3$ need to meet the following requirements:

$$L_1 > \frac{2\pi(r + d_1 + d_2 + h)}{360} \times 2\theta,$$

$$L_2 > \frac{2\pi(r + d_1 + d_2)}{360} \times 2\theta, \text{ and}$$

$$L_3 > \frac{2\pi(r + d_1 + d_2 + 0.5h)}{360} \times 2\theta.$$

In an embodiment, the inner iron core 14 may be a first inner iron core 141 or a second inner iron core 142 or a third inner iron core 143.

Figure 6:
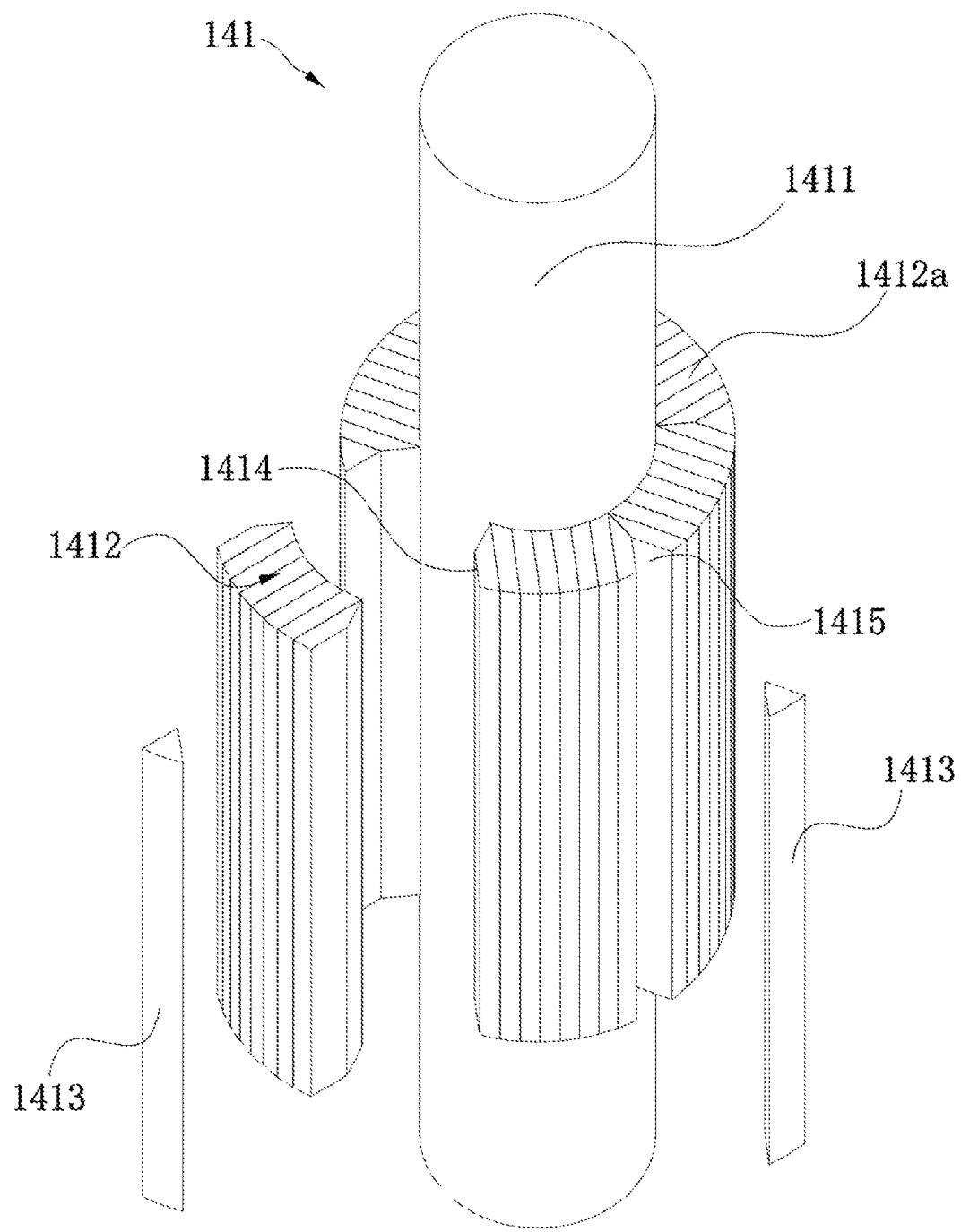
FIG. 6 is a schematic structural diagram of a first inner iron core according to the present invention.

As shown in FIG. 6, in an embodiment, the first inner iron core 141 includes a first central cylinder 1411, a plurality of iron core sector-shaped partitions 1412, and a plurality of wedge strips 1413. The center of the first central cylinder 1411 is the center of the first inner iron core 141, and the axis of the first central cylinder 1411 basically coincides with the axis of the electromagnetic pump. The plurality of iron core sector-shaped partitions 1412 are disposed at least partially surrounding the first central cylinder 1411. The iron core sector-shaped partitions 1412 basically extend in the direction of the first radius $R_1$. The plurality of iron core sector-shaped partitions 1412 are spliced and form a basically sealed cylindrical structure with the first central cylinder 1411. Specifically, the quantity of the outer iron cores 13, the quantity of the first radii $R_1$, the quantity of the iron core sector-shaped partitions 1412, and the quantity of the wedge strips 1413 are all consistent. The quantity of the outer iron cores 13 and the quantity of the first radii $R_1$ may both be adjusted according to an actual requirement. That is, the quantity of the iron core sector-shaped partitions 1412 and the quantity of the wedge strips 1413 may be adjusted according to an actual requirement. An angle between two adjacent first radii $R_1$ is 360/n. That is, the radian of each iron core sector-shaped partition 1412 is 360/n. n is the quantity of the iron core sector-shaped partitions 1412, to facilitate the splicing between two adjacent iron core sector-shaped partitions 1412. In this embodiment, the iron core sector-shaped partitions 1412 are basically sector ring-shaped. Because an extension direction of the iron core sector-shaped partitions 1412 is the direction of the first radius $R_1$, a first notch 1414 is formed at each of two ends of each iron core sector-shaped partition 1412 close to the second protective layer 1532. The first notches 1414 of two adjacent iron core sector-shaped partitions 1412 form second notches 1415. The cross section of the cylindrical space formed by the outer iron cores 13 is a first circle. The first circle has a second radius $R_2$. The cavity dividing structures 154 are basically disposed symmetrically with respect to the second radius $R_2$, and the second notches 1415 are basically provided symmetrically with respect to the second radius $R_2$. In this embodiment, the cross section of each second notch 1415 basically has a triangular shape or a sector shape or another shape. Specifically, the first notch 1414 is provided at each of intersections between an outer arc surface of each iron core sector-shaped partition 1412 and two sides of the iron core sector-shaped partition 1412. After two adjacent iron core sector-shaped partitions 1412 are spliced, two first notches 1414 form a second notch 1415. The outer arc surface of each iron core sector-shaped partition 1412 refers to a surface of the iron core sector-shaped partition 1412 close to the second protective layer 1532.

In an embodiment, each wedge strip 1413 is at least partially disposed between two adjacent iron core sector-shaped partitions 1412. Specifically, the wedge strip 1413 is disposed in the second notch 1415, and the shape of the cross section of the wedge strip 1413 is basically consistent with the shape of the cross section of the second notch 1415. That is, in a projection surface perpendicular to the axial direction of the electromagnetic pump 100, a protection of the wedge strip 1413 onto the projection surface in the axial direction of the electromagnetic pump 100 is a first projection surface, a projection of the second notch 1415 onto the projection surface in the axial direction of the electromagnetic pump 100 is a second projection surface, and the first projection surface basically coincides with the second projection surface. In this embodiment, the cross section of each wedge strip 1413 basically also has a triangular shape or a sector shape or another shape. The wedge strip 1413 is made of magnetically non-conductive stainless steel. The cavity dividing structure 154 divides the circulation channel 151 into a plurality of channels. The cross section of each channel is basically annular. The configuration of the cross section of each channel is a cavity arc. Through the foregoing arrangement, a pole arc may be larger than the cavity arc, thereby reducing the circulation of liquid metal in the pump channel mechanism 15, thereby improving the flow rate and efficiency of the electromagnetic pump 100.

In an embodiment, the iron core sector-shaped partition 1412 includes a plurality of first laminates 1412a. A quantity m of the first laminates 1412a of each iron core sector-shaped partition 1412 may be adjusted according to an actual requirement. A width w of each first laminate 1412a is basically consistent. The first laminates 1412a basically extend in the direction of the first radius $R_1$. The width w of the first laminate 1412a is a width in the direction perpendicular to the first radius $R_1$. Specifically:

$$m = \frac{2r\sin(180/n)}{w} - 2,$$

where n is the quantity of the iron core sector-shaped partitions 1412, and r is a radius of the first inner iron core 141. In this embodiment, the first laminate 1412a is a cold-rolled oriented silicon steel sheet, and the width w of the first laminate 1412*a* satisfies thickness specifications of existing silicon steel sheets. Through the foregoing arrangement, the width w of each first laminate 1412*a* is controlled, so that the size of the wedge strip 1413 has a very flexible adjustment space. The wedge strip 1413 fits the outer iron cores 13 and the cavity dividing structure 154, so that a maximum pole arc can be ensured, making the pole arc larger than the cavity arc, thereby reducing the circulation of liquid metal in the pump channel mechanism 15, thereby improving the flow rate and efficiency of the electromagnetic pump 100. In addition, the first inner iron core 141 is formed by the plurality of first laminates 1412*a*, so that the circumferential circulation in the first inner iron core 141 is reduced by increasing a contact resistance.

In an embodiment, a processing method of the iron core sector-shaped partitions 1412 includes the following steps:

S1: Select a plurality of first laminates 1412*a* that have the same height, the same width, and different lengths.

S2: Arrange the plurality of first laminates 1412*a* and fixedly connect two adjacent first laminates 1412*a*, to form each iron core sector-shaped partition 1412 with a cross section being a sector ring shape.

S3: Splice the plurality of iron core sector-shaped partitions 1412 into an annular body, where the second notch 1415 is formed at a splicing joint of two adjacent iron core sector-shaped partitions 1412.

S4: Arrange the wedge strips 1413 in the second notches 1415, so that the wedge strips 1413, the plurality of iron core sector-shaped partitions 1412, and the first central cylinder 1411 together form the first inner iron core 141 with a cross section being a circle.

In step S1, the height of the first laminate 1412*a* refers to a length in the axial direction of the electromagnetic pump 100, the width of the first laminate 1412*a* refers to a length in a direction perpendicular to the first radius R1, and the length of the first laminate 1412*a* refers to a length in a direction parallel to the first radius R1. An arrangement manner of the plurality of first laminates 1412*a* in step S2 is: the first laminate 1412*a* close to the first radius R1 has the largest length, and the first laminate 1412*a* away from the first radius R1 has the smallest length. Through the foregoing arrangement, the shape of the cross section of the iron core sector-shaped partition 1412 may be basically a sector ring shape, to facilitate the splicing between two adjacent iron core sector-shaped partitions 1412. A connection manner between the first laminates 1412*a* may be bonding with an adhesive. In addition, borders between the iron core sector-shaped partitions 1412 formed in step S2 are filed, so that the borders between the iron core sector-shaped partitions 1412 become smoother, to facilitate the splicing between the iron core sector-shaped partitions 1412. An angle corresponding to the radian configuration of the cross section of the sector ring shape is $\beta=360/n$, and n is the quantity of the iron core sector-shaped partitions 1412.

In step S3, the iron core sector-shaped partitions 1412 are bonded with an adhesive. In step S4, the wedge strip 1413 and the second notch 1415 are bonded with an adhesive. That is, the iron core sector-shaped partition 1412 and the wedge strip 1413 are bonded with an adhesive, and the iron core sector-shaped partition 1412 and the first central cylinder 1411 are also bonded with an adhesive.

Specifically, the processing method of the iron core sector-shaped partitions 1412 further includes:

S5: Arrange the second protective layer 1532 on an outer side of the first inner iron core 141 to fix the first inner iron core 141.

S6: Arrange the circulation channel 151 and the pump channel wall 152 on an outer side of the second protective layer 1532; and dividing the circulation channel 151 into n channels by using the cavity dividing structure 154.

S7: Arrange the first protective layer 1531 on an outer side of the pump channel wall 152.

S8: Connect the pump channel mechanism 15 and the first inner iron core 141.

In step S5, the second protective layer 1532 is made of carbon fiber, and the second protective layer 1532 is polished to make the surface of the second protective layer 1532 smooth. The pump channel wall 152 in step S6 is made of ceramic. The pump channel wall 152 includes the first pump channel wall 1521 and the second pump channel wall 1522. The first pump channel wall 1521 and the second pump channel wall 1522 form the circulation channel 151. The cavity dividing structure 154 is disposed between the first pump channel wall 1521 and the second pump channel wall 1522 and is respectively connected to the first pump channel wall 1521 and the second pump channel wall 1522. In addition, the pump channel wall 152 on two sides of the circulation channel 151 needs to be polished, to make the surface of the pump channel wall 152 smooth and uniform, to facilitate the flow of liquid metal. In step S7, the first protective layer 1531 is made of carbon fiber, and the first protective layer 1531 is polished to make the surface of the first protective layer 1531 smooth. In step S8, the pump channel mechanism 15 is heated. That is, the pump channel wall 152 and the protective layer 153 are heated to make the pump channel mechanism 15 expand under heat. At a high temperature state, the pump channel mechanism 15 is disposed surrounding the first inner iron core 141, to implement an interference fit connection between the pump channel mechanism 15 and the first inner iron core 141, making the assembly of the pump channel mechanism 15 and the first inner iron core 141 more stable, thereby improving the stability of the electromagnetic pump 100.

Through the foregoing arrangement, it can be ensured that the center of the protective layer 153, the center of the first inner iron core 141, the center of the first central cylinder 1411, and the center of the pump channel wall 152 basically coincide, thereby implementing the concentricity of the electromagnetic pump 100, so that a possibility that single-sided magnetic pressure occurs can be effectively reduced, thereby improving the stability of the electromagnetic pump 100.

Figure 7:
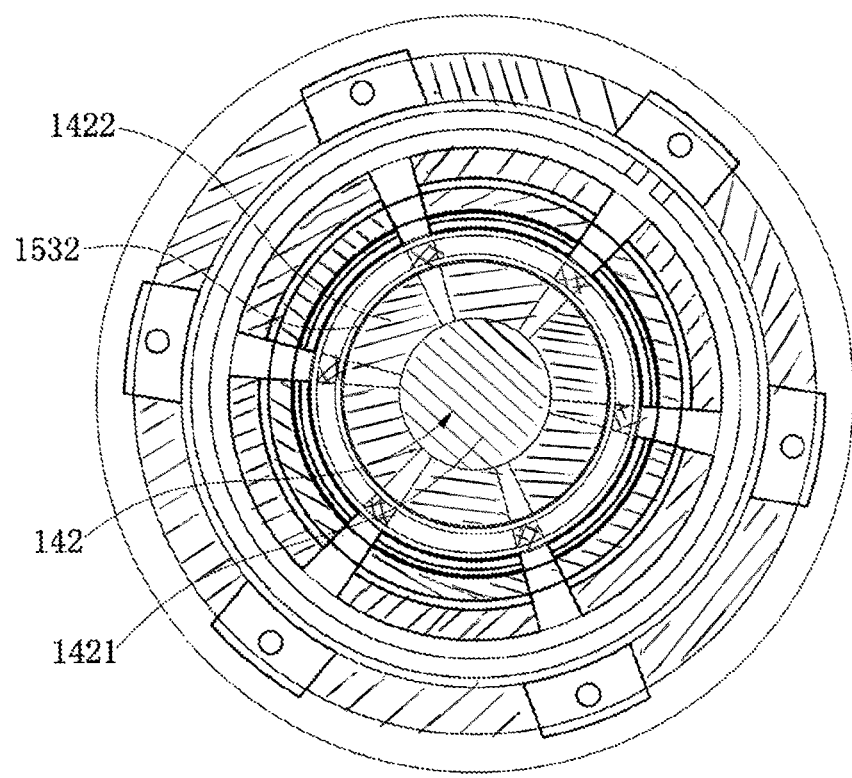
FIG. 7 is a schematic structural diagram of a second inner iron core according to the present invention.

As shown in FIG. 7, in an embodiment, the second inner iron core 142 includes a second central cylinder 1421 and a plurality of first iron cores 1422. The plurality of first iron cores 1422 are disposed surrounding the second central cylinder 1421, and the plurality of first iron cores 1422 are connected to the second central cylinder 1421. The plurality of first iron cores 1422 are disposed in a rib form. The plurality of first iron cores 1422 are at least partially disposed between the second protective layer 1532 and the second central cylinder 1421. Specifically, an end surface of an end of each of the plurality of first iron cores 1422 connected to the second central cylinder 1421 is an arc surface. The end surface of the end of each of the plurality of first iron cores 1422 connected to the second central cylinder 1421 forms a first cylindrical space, and the second central cylinder 1421 is at least partially disposed in the first cylindrical space, to facilitate the stable connection between the plurality of first iron cores 1422 and the second central cylinder 1421. An end surface of an end of each of the plurality of first iron cores 1422 close to the second protective layer 1532 is a first arc surface, and the radius of the first arc surface is basically consistent with the radius of the second protective layer 1532, to make the first iron cores 1422 to be connected to or abut against the second protective layer 1532 more stably. Through the foregoing arrangement, the second inner iron core 142 may be in the form of blocks by using the plurality of first iron cores 1422, so that the magnetic field in the pump channel mechanism 15 and the output of the electromagnetic pump 100 are not affected, and eddy currents can be effectively inhibited, to reduce the loss and temperature rise of the electromagnetic pump 100 during operation, thereby improving the efficiency and service life of the electromagnetic pump 100. In addition, when the first iron cores 1422 form rib structures, the eddy current distribution is no longer annular. Instead, small eddies on a cross section of each rib are formed, to block a circumferential eddy current path, thereby reducing the eddy current loss.

In this embodiment, the quantity of the first iron cores 1422 may be adjusted according to an actual requirement. A ratio of the quantity of the outer iron cores 13 to the quantity of the first iron cores 1422 may be 1. That is, the quantity of the outer iron cores 13 is consistent with the quantity of the first iron cores 1422.

Figure 8:
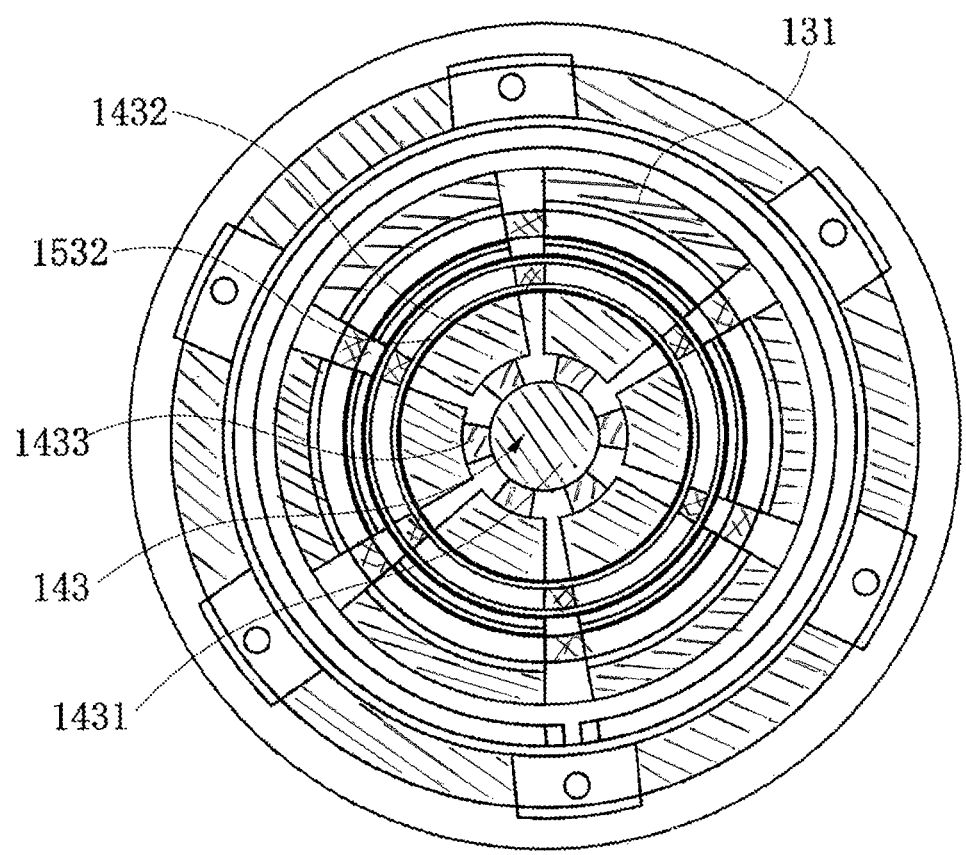
FIG. 8 is a schematic structural diagram of a first outer iron core and a third inner iron core according to the present invention.

As shown in FIG. 8, in an embodiment, the third inner iron core 143 includes a third central cylinder 1431, a plurality of second iron cores 1432, and a plurality of fixing structures 1433. The plurality of second iron cores 1432 are disposed surrounding the third central cylinder 1431, the plurality of fixing structures 1433 are disposed surrounding the third central cylinder 1431, and the second iron cores 1432 are connected to the third central cylinder 1431 by the fixing structures 1433. The plurality of second iron cores 1432 are disposed in a rib form. The plurality of fixing structures 1433 are disposed in a rib form the plurality of second iron cores 1432 are at least partially disposed between the second protective layer 1532 and the fixing structures 1433. Specifically, the quantity of the second iron cores 1432 is consistent with the quantity of the fixing structures 1433. The fixing structures 1433 are at least partially disposed between the second iron cores 1432 and the third central cylinder 1431. One end of each fixing structure 1433 is connected to a corresponding second iron core 1432, and the other end of the fixing structure 1433 is connected to the third central cylinder 1431. Specifically, an end surface of an end of each of the plurality of fixing structures 1433 close to the third central cylinder 1431 is an arc surface. The end surface of the end of each of the plurality of fixing structures 1433 close to the third central cylinder 1431 forms a second cylindrical space, and the third central cylinder 1431 is at least partially disposed in the second cylindrical space, to facilitate the stable connection between the fixing structures 1433 and the third central cylinder 1431. An end surface of an end of each of the plurality of second iron cores 1432 close to the fixing structures 1433 is a second arc surface, and an end surface of an end of each of the plurality of fixing structures 1433 close to the second iron cores 1432 is a third arc surface. The radius of the second arc surface is basically consistent with the radius of the third arc surface, to facilitate the stable connection between the second iron cores 1432 and the fixing structures 1433. An end surface of an end of each of the plurality of second iron cores 1432 close to the second protective layer 1532 is a fourth arc surface, and the radius of the fourth arc surface is basically consistent with the radius of the second protective layer 1532, to make the second iron cores 1432 to be connected to or abut against the second protective layer 1532 more stably. Through the foregoing arrangement, the second iron cores 1432 and the fixing structures 1433 may form rib structures, so that the magnetic field in the pump channel mechanism 15 and the output of the electromagnetic pump 100 are not affected, and eddy currents can be effectively inhibited, to reduce the loss and temperature rise of the electromagnetic pump 100 during operation, thereby improving the efficiency and service life of the electromagnetic pump 100. In addition, when the second iron cores 1432 and the fixing structures 1433 form rib structures, the eddy current distribution is no longer annular. Instead, small eddies on a cross section of each rib are formed, to block a circumferential eddy current path, thereby reducing the eddy current loss.

In this embodiment, the quantity of the second iron cores 1432 may be adjusted according to an actual requirement, and the quantity of the fixing structures 1433 may be adjusted according to an actual requirement. A ratio of the quantity of the outer iron cores 13 to the quantity of the second iron cores 1432 may be 1. That is, the quantity of the outer iron cores 13 is consistent with the quantity of the second iron cores 1432.

In an embodiment, the pump body 11 may be a housing 112 or an outer rib assembly 113.

Figure 9:
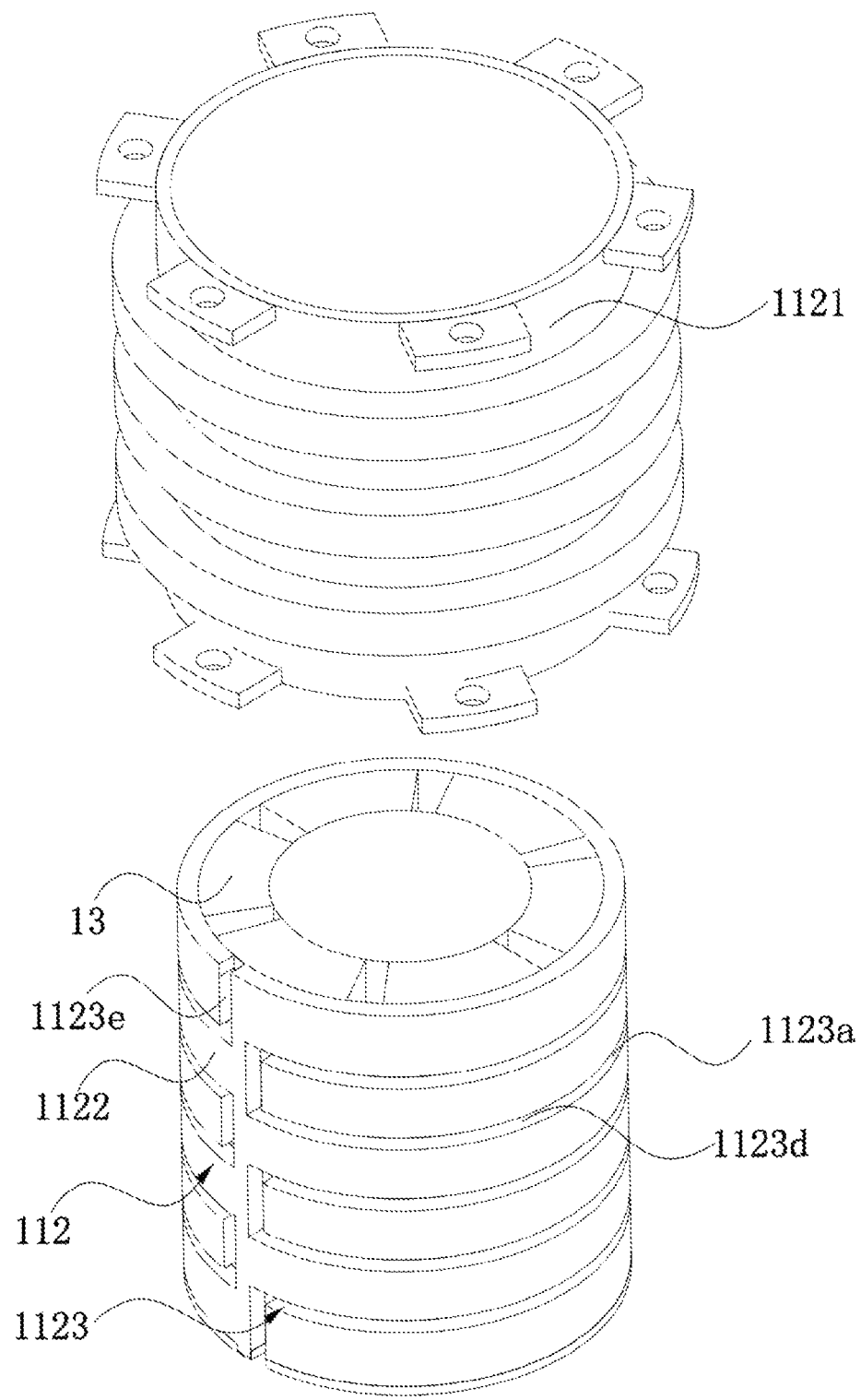
FIG. 9 is a first schematic structural diagram of a pump body according to the present invention.
Figure 10:
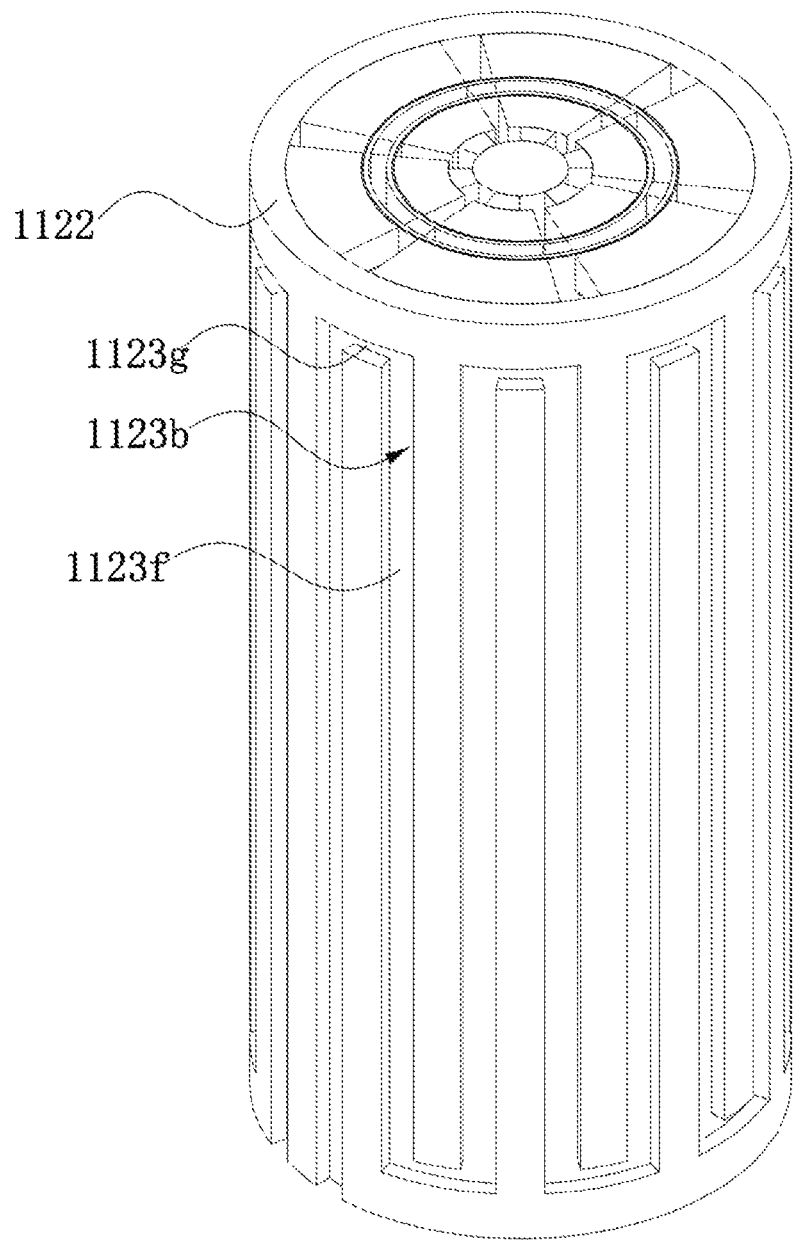
FIG. 10 is a second schematic structural diagram of a pump body according to the present invention.
Figure 11:
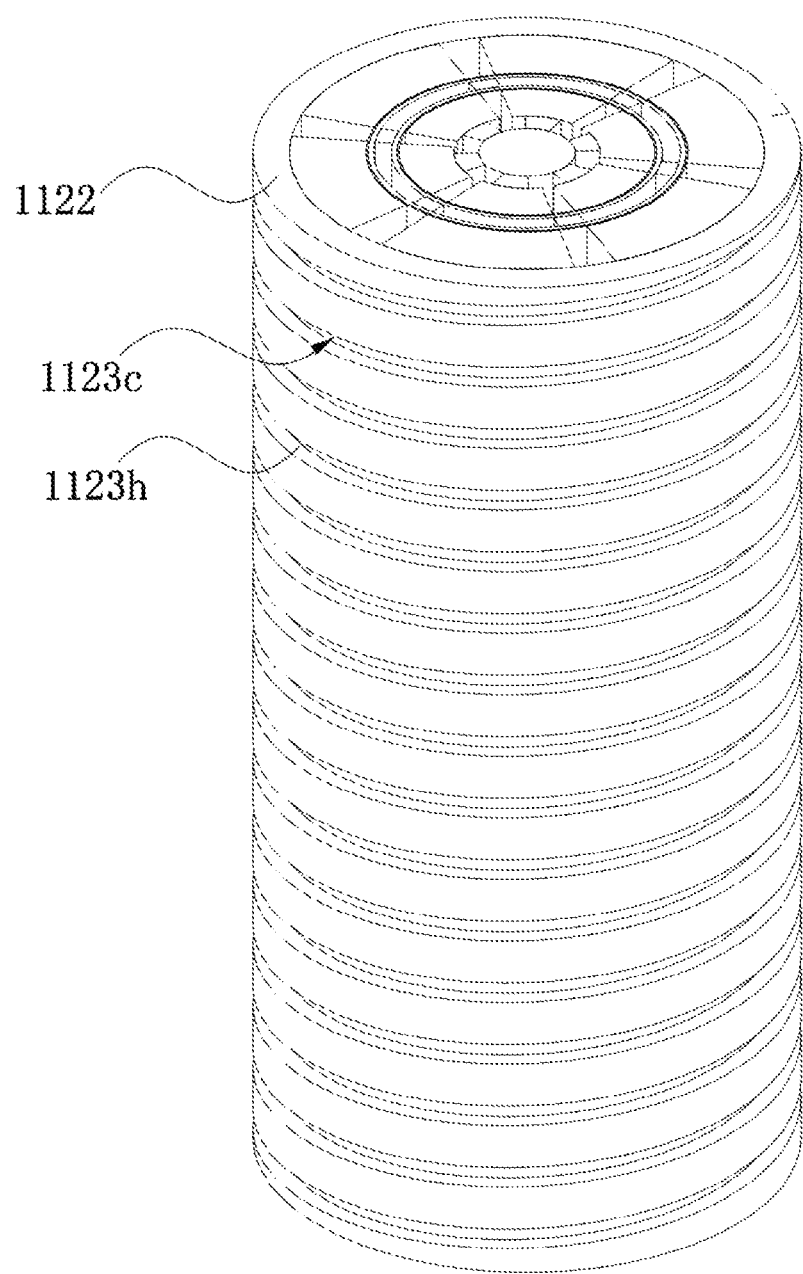
FIG. 11 is a third schematic structural diagram of a pump body according to the present invention.

As shown in FIG. 9 to FIG. 11, in an embodiment, the housing 112 includes a first housing 1121 and a second housing 1122. The second housing 1122 is disposed at least partially surrounding the plurality of outer iron cores 13. That is, the plurality of outer iron cores 13 are disposed at least partially in the second housing 1122. The first housing 1121 is disposed surrounding the second housing 1122. The second housing 1122 is used for wrapping the plurality of outer iron cores 13, to fix the plurality of outer iron cores 13. Specifically, a cooling mechanism 1123 is further disposed on the second housing 1122. The cooling mechanism 1123 is used for cooling the electromagnetic pump 100. Specifically, the cooling mechanism 1123 may include a first cooling water passage 1123a and/or a second cooling water passage 1123b and/or a third cooling water passage 1123c, and is used for improving the cooling effect of the cooling mechanism 1123, thereby improving the heat dissipation efficiency and service life of the electromagnetic pump 100.

As shown in FIG. 9, in an embodiment, the first cooling water passage 1123a includes a plurality of first water passages 1123d and a plurality of first connection water passages 1123e. The first water passages 1123d are provided surrounding the second housing 1122. That is, the first water passages 1123d are provided in a circumferential direction of the second housing 1122. The first connection water passages 1123e are basically provided in an axial direction of the second housing 1122. Each first connection water passage 1123e is provided between two adjacent first water passages 1123d, one end of the first connection water passage 1123e is connected to one first water passage 1123d, and the other end of the first connection water passage 1123e is connected to the adjacent first water passage 1123d, to allow communication between the two adjacent first water passages 1123d, thereby implementing the circulation of a coolant. Specifically, the first housing 1121 is disposed surrounding the second housing 1122, so that may enable the first housing 1121 and the first cooling water passage 1123a to form a sealed circulating water passage, so that the coolant may flow in the first cooling water passage 1123a and no leakage is caused, thereby improving the sealing performance and cooling effect of the electromagnetic pump 100.

As shown in FIG. 10, in an embodiment, the second cooling water passage 1123b includes a plurality of second water passages 1123f and a plurality of second connection water passages 1123g. The second water passages 1123f are provided in the circumferential direction of the second housing 1122. That is, the second water passages 1123f are basically provided parallel to the second housing 1122. The second connection water passages 1123g are basically provided in the circumferential direction of the second housing 1122. Each second connection water passage 1123g is provided between two adjacent second water passages 1123f, one end of the second connection water passage 1123g is connected to one second water passage 1123f, and the other end of the second connection water passage 1123g is connected to the adjacent second water passage 1123f, to allow communication between the two adjacent second water passages 1123f, thereby implementing the circulation of a coolant. Specifically, the first housing 1121 is disposed surrounding the second housing 1122, so that may enable the first housing 1121 and the second cooling water passage 1123b to form a sealed circulating water passage, so that the coolant may flow in the second cooling water passage 1123b and no leakage is caused, thereby improving the sealing performance and cooling effect of the electromagnetic pump 100.

As shown in FIG. 11, in an embodiment, the third cooling water passage 1123c includes a third water passage 1123h. The third water passage 1123h is basically spirally disposed in the circumferential direction of the second housing 1122. That is, the third water passage 1123h basically has a spiral form and is provided in the second housing 1122. Specifically, the first housing 1121 is disposed surrounding the second housing 1122, so that may enable the first housing 1121 and the third cooling water passage 1123c to form a sealed circulating water passage, so that the coolant may flow in the third cooling water passage 1123c and no leakage is caused, thereby improving the sealing performance and cooling effect of the electromagnetic pump 100.

Figure 12:
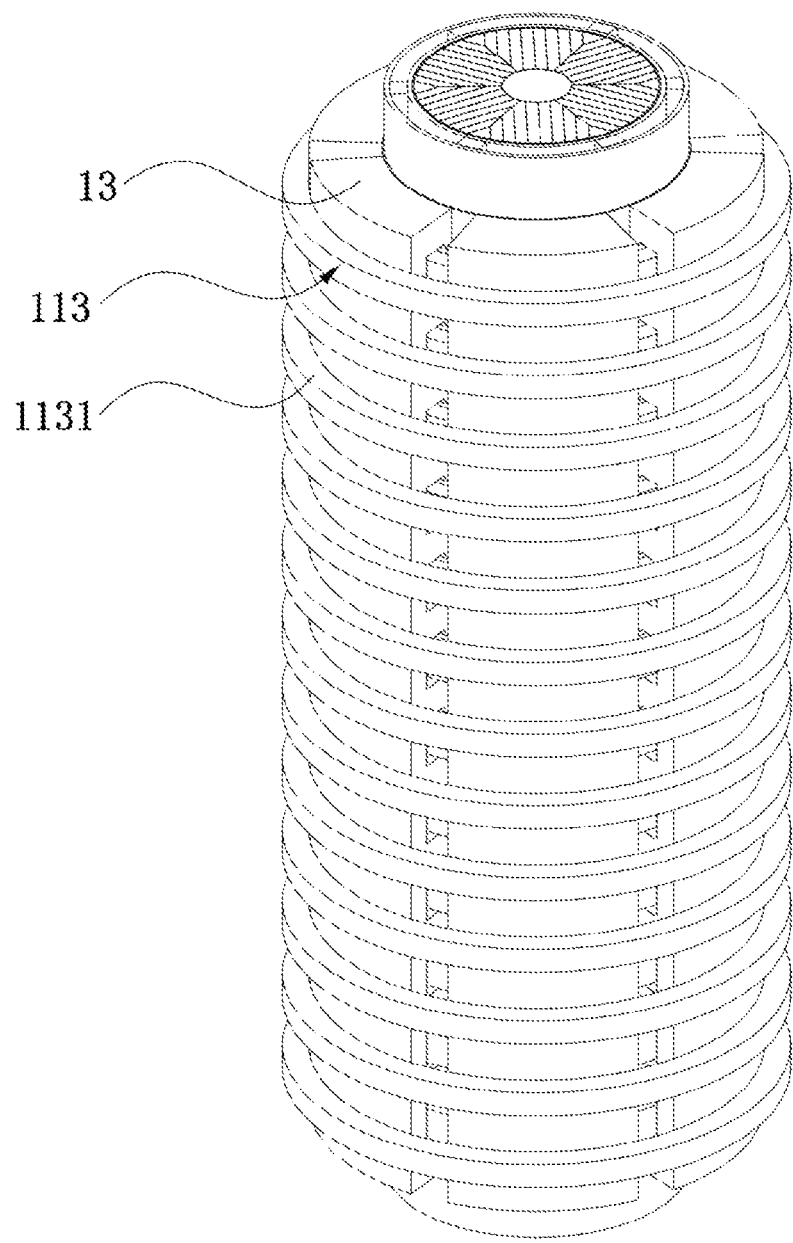
FIG. 12 is a fourth schematic structural diagram of a pump body according to the present invention.

As shown in FIG. 12, in an embodiment, the outer rib assembly 113 is disposed on outer sides of the plurality of outer iron cores 13, and is used for fixing the plurality of outer iron cores 13. Specifically, the outer rib assembly 113 includes a plurality of annular ribs 1131. The plurality of annular ribs 1131 form an accommodating space. The plurality of outer iron cores 13 are at least partially disposed in the accommodating space. The plurality of annular ribs 1131 are disposed in the axial direction of the electromagnetic pump 100, and an arrangement manner of the plurality of annular ribs 1131 may be uniform or nonuniform. That is, in the axial direction of the electromagnetic pump 100, distances between two adjacent annular ribs 1131 may be consistent or inconsistent. In this embodiment, the quantity of the annular ribs 1131 may be adjusted according to an axial length of the electromagnetic pump 100 or may continue to be adjusted according to an actual requirement.

Figure 13:
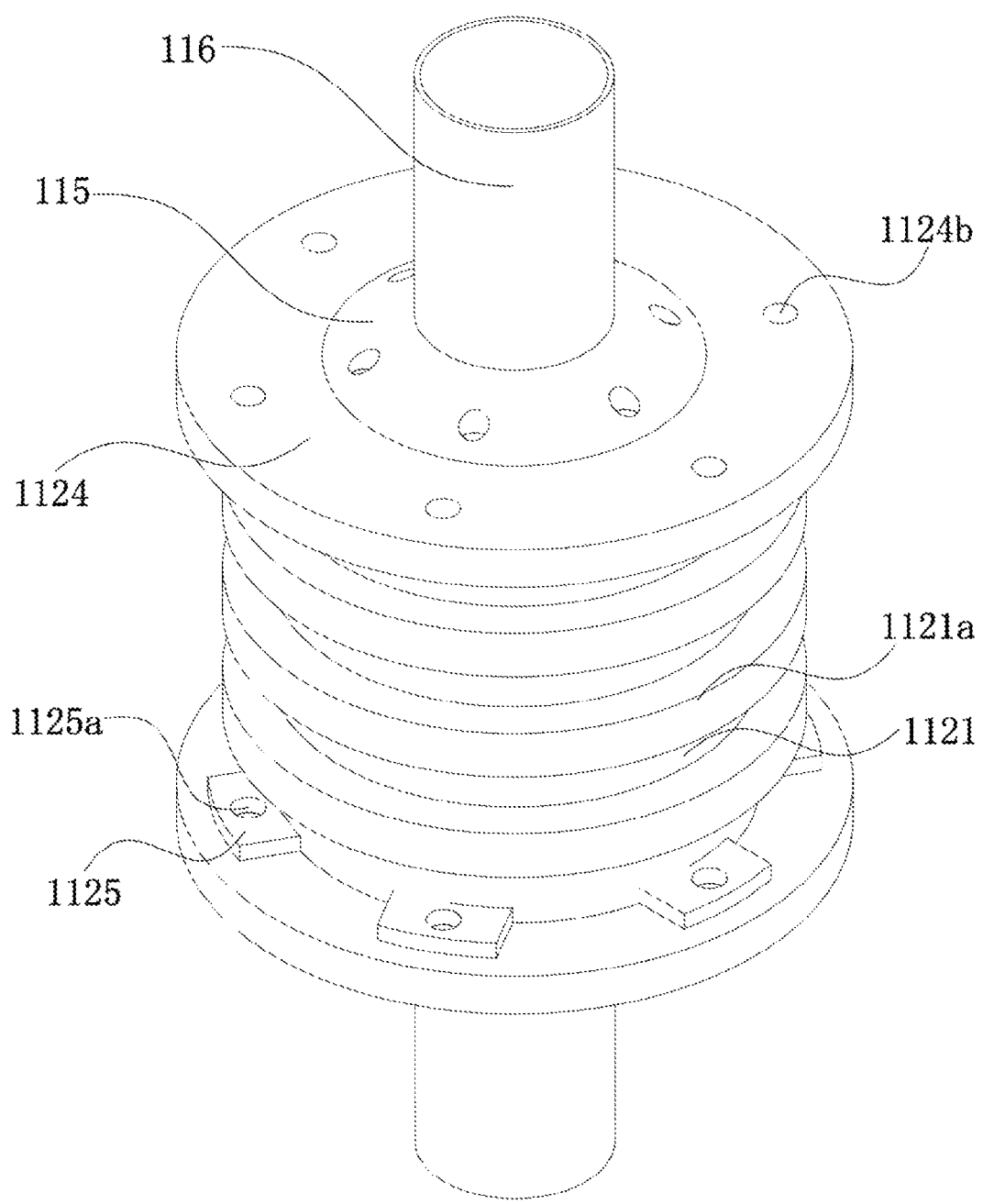
FIG. 13 is a fifth schematic structural diagram of a pump body according to the present invention.

As shown in FIG. 13, in an embodiment, in a case that the pump body 11 is the housing 112, the pump body 11 further includes a first end cover 1124. The first end cover 1124 is disposed at two ends of the housing 112. Specifically, connection parts 1125 are disposed at two ends of the housing 112. The connection parts 1125 are disposed surrounding the circumference of the housing 112. The housing 112 and the first end cover 1124 are connected by the connection parts 1125. A first through hole is provided in the first end cover 1124. The first through hole is sleeved over the pump channel mechanism 15. That is, the first through hole is provided surrounding the pump channel mechanism 15. Specifically, the diameter of the first through hole is basically consistent with the diameter of the first protective layer 1531, to facilitate the stable connection between the first end cover 1124 and the pump channel mechanism 15. In this embodiment, the connection parts 1125 may be disposed at two ends of the first housing 1121 and/or the second housing 1122.

A plurality of reinforcing ribs 1121a are disposed on an outer surface of the first housing 1121. The reinforcing ribs 1121a are used for improving the rigidity and strength of the housing 112. The plurality of reinforcing ribs 1121a may be evenly distributed on the first housing 1121, to improve the overall rigidity and strength of the first housing 1121. The plurality of reinforcing ribs 1121a may gather on the first housing 1121, to improve the local rigidity and strength of the first housing 1121, thereby avoiding damage caused by an excessively large force at a local position of the first housing 1121. Specifically, the reinforcing ribs 1121a may be made of stainless steel, and the quantity of the reinforcing ribs 1121a may be adjusted according to an actual requirement. In this embodiment, an inner radius of each reinforcing rib 1121a is equal to an outer radius of the first housing 1121, and an outer radius of the reinforcing rib 1121a may be adjusted according to an actual requirement. The inner radius of the reinforcing rib 1121a refers to a distance between a surface of the reinforcing rib 1121a close to the first housing 1121 and the center of circle. The outer radius of the reinforcing rib 1121a refers to a distance between a surface of the reinforcing rib 1121a away from the first housing 1121 and the center of circle. The outer radius of the first housing 1121 refers to a distance between a surface of the housing 112 close to the reinforcing rib 1121a and the center of circle. Through the foregoing arrangement, the structure of the housing 112 may be more stable, thereby improving the structural stability of the electromagnetic pump 100.

In this embodiment, a first mounting hole 1125a is provided in each connection part 1125, and a second mounting hole 1124b is provided in the first end cover 1124. The first mounting hole 1125a and the second mounting hole 1124b are connected by a bolt, so that the first end cover 1124 and the connection part 1125 are stably connected, and the first end cover 1124 and the housing 112 are stably connected. The housing 112 may be made of stainless steel, and the first end cover 1124 may be made of stainless steel. The shape of the cross section of the first end cover 1124 may be a circle or a square. It may be understood that the shape of the cross section of the first end cover 1124 may be another shape, and may be adjusted according to an actual requirement.

In this embodiment, the plurality of outer iron cores 13 and the housing 112 are integrally formed, the connection parts 1125 and the outer iron cores 13 are integrally formed, and the reinforcing ribs 1121a and the housing 112 are integrally formed. In this case, the housing 112, the outer iron cores 13, and the winding 12 are integrally formed. In a production process, the housing 112, the outer iron cores 13, and the winding 12 may be immersed in an insulating paint, thereby improving the safety of the electromagnetic pump 100.

In this embodiment, the plurality of outer iron cores 13 and the housing 112 may be connected in a welding form. The connection parts 1125 and the outer iron cores 13 may be connected in a welding form. Through the foregoing arrangement, the center of the cross section of the cylindrical space formed by the plurality of outer iron cores 13, that is, the first circle, may basically coincide with the center of circle of the housing 112, thereby implementing the concentricity of the electromagnetic pump 100, so that a possibility that single-sided magnetic pressure occurs can be effectively reduced, thereby improving the stability of the electromagnetic pump 100 and improving the flow rate and efficiency of the electromagnetic pump 100.

Figure 17:
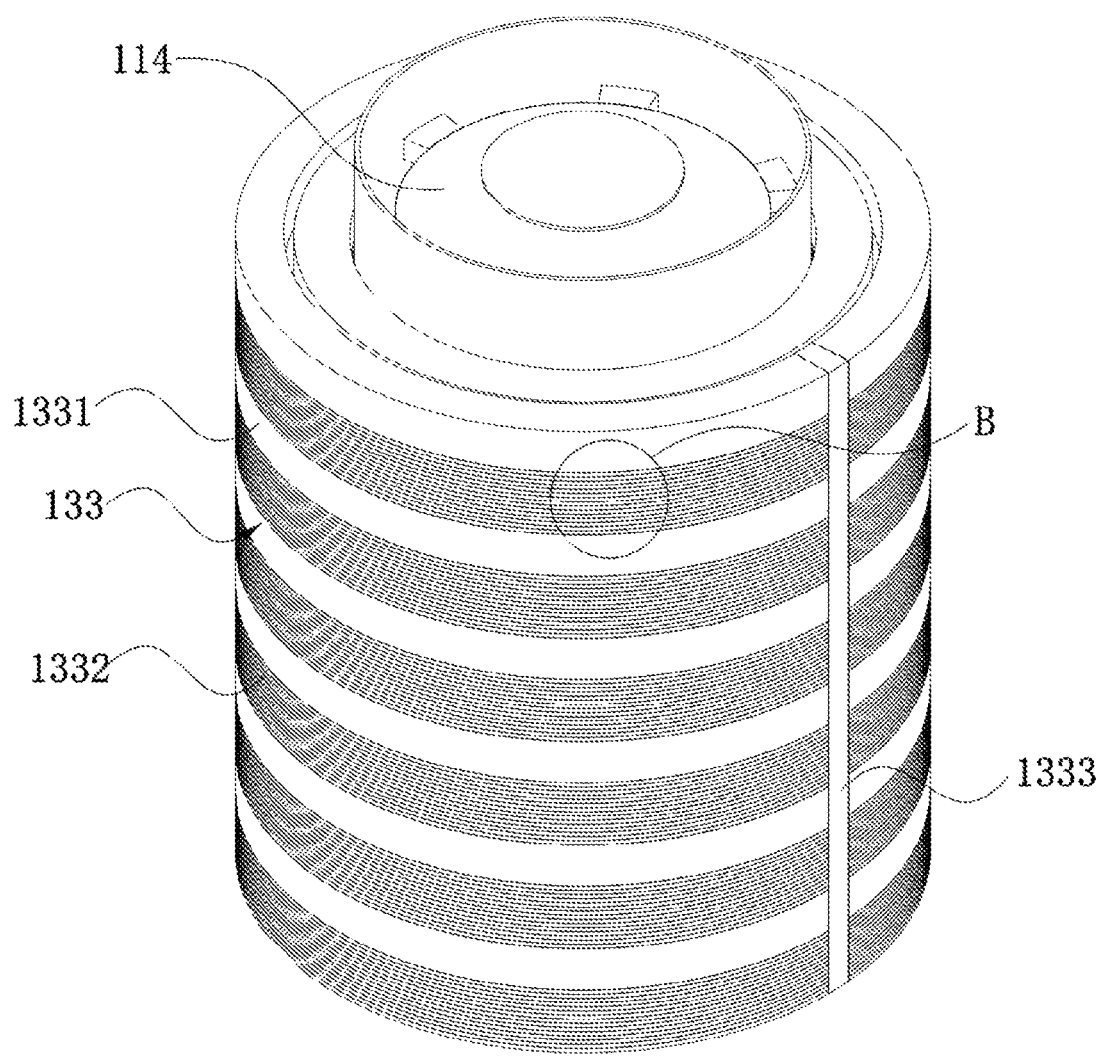
FIG. 17 is a schematic structural diagram of a third outer iron core according to the present invention.

As shown in FIG. 17, in an embodiment, a second end cover 114 is further disposed at each of two ends of the inner iron core 14. The second end covers 114 are used for sealing the inner iron core 14, to separate the inner iron core 14 and the liquid metal in the circulation channel 151, that is, to keep the inner iron core 14 from contacting the liquid metal. In addition, a first channel for the liquid metal to flow through may be further formed in the second end cover 114, so that when flowing out from the circulation channel 151, liquid metal may flow out from the electromagnetic pump 100 along the first channel. In this way, when flowing into the circulation channel 151, the liquid metal may flow into the electromagnetic pump 100 along the first channel. Through the foregoing arrangement, the flow of liquid metal can be facilitated, thereby improving the flow rate and efficiency of the electromagnetic pump 100.

In an embodiment, the central cylinder includes a first central cylinder 1411 or a second central cylinder 1421 or a third central cylinder 1431. The central cylinder includes at least a first state or a second state or a third state.

In the first state, the central cylinder may be disposed on an inner side of the second end cover 114. The inner side of the second end cover 114 refers to a side of the second end cover 114 close to the iron core sector-shaped partitions 1412.

As shown in FIG. 13, in a second state, the central cylinder may pass through the second end cover 114 and is at least partially disposed on an outer side of the second end cover 114. The pump channel mechanism 15 extends between the second end cover 114 and the central cylinder in the axial direction of the electromagnetic pump 100. That is, in the axial direction of the electromagnetic pump 100, the length of the pump channel mechanism 15 is greater than the length of the inner iron core 14, and the length of the pump channel mechanism 15 is less than the length of the central cylinder. The outer side of the second end cover 114 refers to a side of the second end cover 114 away from the inner iron core 14. Specifically, the first pump channel wall 1521 extends between the second end cover 114 and the central cylinder in the axial direction of the electromagnetic pump 100, and the second protective layer 1532 extends between the second end cover 114 and the central cylinder in the axial direction of the electromagnetic pump 100. Neither of the second pump channel wall 1522 nor the second protective layer 1532 extends in the axial direction of the electromagnetic pump 100. The second pump channel wall 1522 is connected to the second end cover 114, to implement the sealing of the inner iron core 14 by the second end cover 114.

Specifically, in the second state, the pump body 11 further includes a connection mechanism 115 and a first outer pipe 116. The connection mechanism 115 is connected to the first end cover 1124, and the first outer pipe 116 is connected to the connection mechanism 115, so that the first end cover 1124 and the first outer pipe 116 are connected by the connection mechanism 115. In this case, when flowing out from the circulation channel 151, the liquid metal flows into the first outer pipe 116 through the connection mechanism 115, to enable the liquid metal to flow out from the electromagnetic pump 100. When the liquid metal enters from the circulation channel 151, the liquid metal flows from outside the electromagnetic pump 100 into the connection mechanism 115 through the first outer pipe 116, and flows into the circulation channel 151 through the connection mechanism 115. The connection structure may be a flange.

Figure 14:
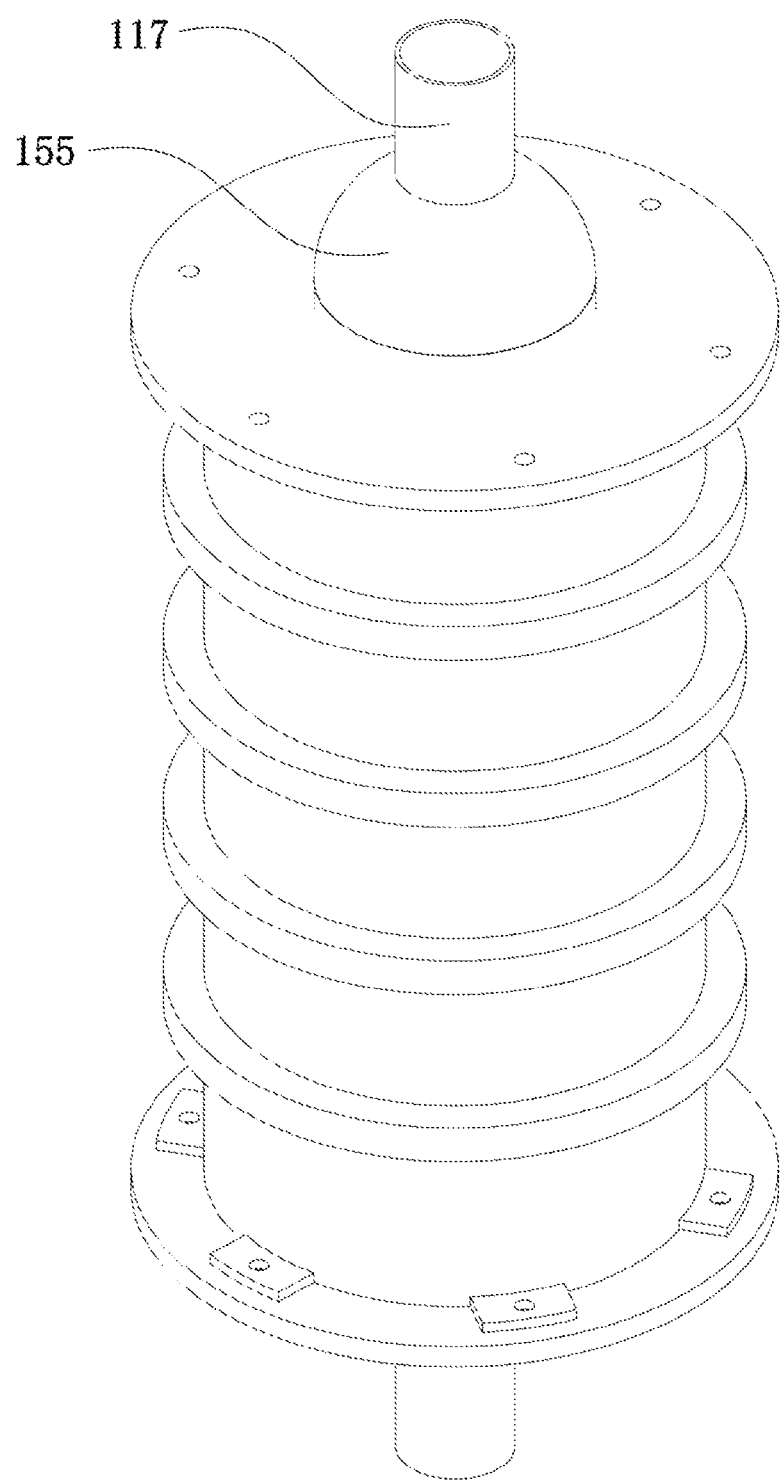
FIG. 14 is a sixth schematic structural diagram of a pump body according to the present invention.

As shown in FIG. 14, in a third state, the first pump channel wall 1521 and the first protective layer 1531 extend in the axial direction of the electromagnetic pump 100, and extension lengths of the first pump channel wall 1521 and the first protective layer 1531 are basically consistent. Neither of the second pump channel wall 1522 nor the first protective layer 1531 extends in the axial direction of the electromagnetic pump. An axial length of the first pump channel wall 1521 is greater than an axial length of the second pump channel wall 1522, and an axial length of the first protective layer 1531 is greater than an axial length of the second protective layer 1532. Specifically, the first pump channel wall 1521 and the first protective layer 1531 extend to form a first outer wall layer 155. An end of the first outer wall layer 155 away from the inner iron core 14 gradually approach the axial direction of the electromagnetic pump 100, until a pipe opening is formed at the end of the first outer wall layer 155 away from the inner iron core 14. In this case, the pump body 11 further includes a second outer pipe 117. The second outer pipe 117 is connected to the pipe opening. When flowing out from the circulation channel 151, the liquid metal flows into the second outer pipe 117 through the first outer wall layer 155, to enable the liquid metal to flow out from the electromagnetic pump 100. When the liquid metal enters from the circulation channel 151, the liquid metal flows from outside the electromagnetic pump 100 into the first outer wall layer 155 through the second outer pipe 117, and flows into the circulation channel 151 through the first outer wall layer 155.

Figure 15:
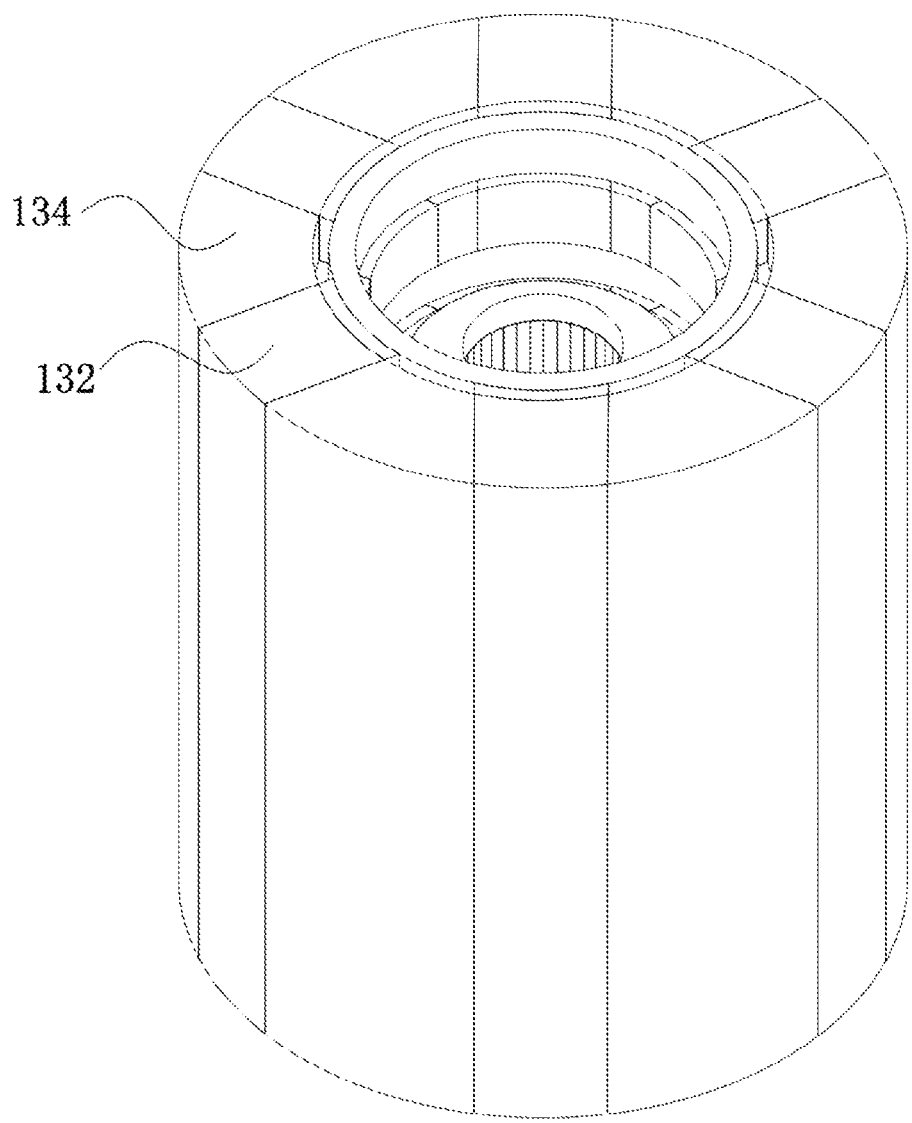
FIG. 15 is a schematic structural diagram of a second outer iron core according to the present invention.
Figure 18:
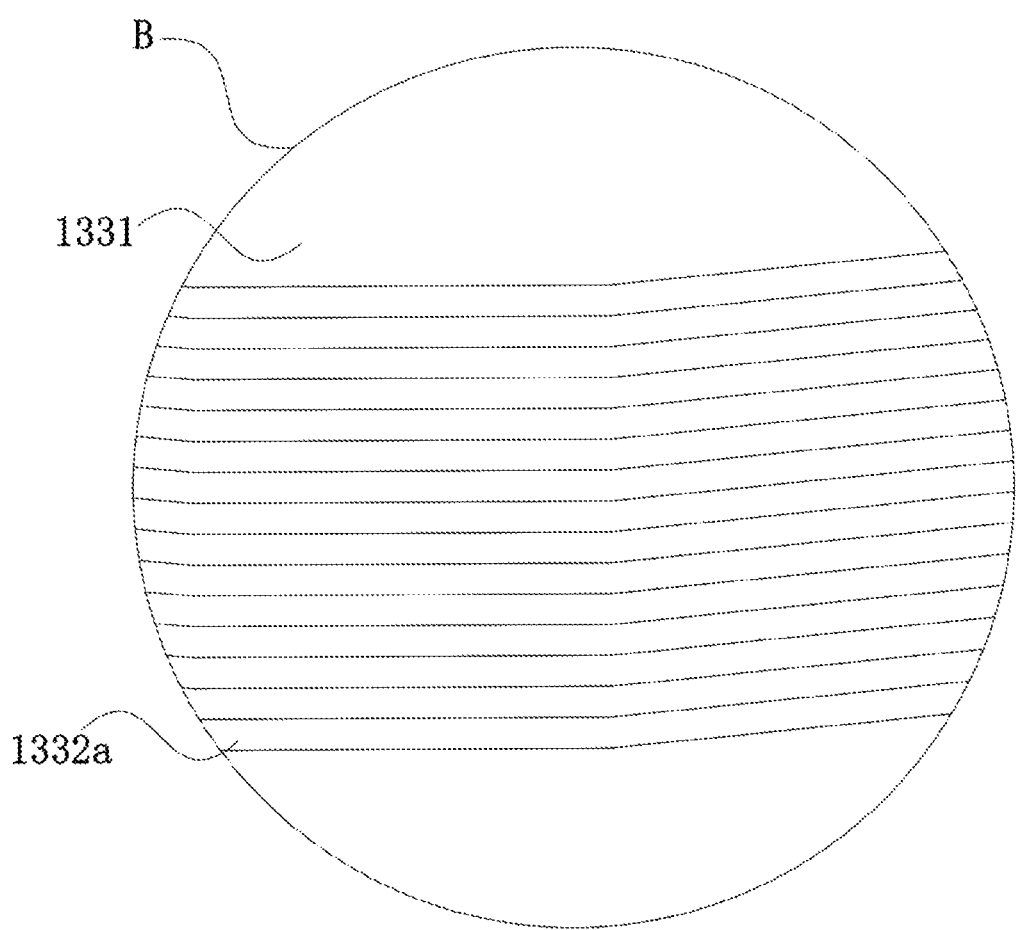
FIG. 18 is a partial enlarged view of B in FIG. 17 according to the present invention.

As shown in FIG. 8, FIG. 15, and FIG. 18, in an embodiment, each outer iron core 13 includes a first outer iron core 131 or a second outer iron core 132 or a third outer iron core 133.

As shown in FIG. 8, in an embodiment, the plurality of first outer iron cores 131 are disposed at least partially surrounding the pump channel mechanism 15. Specifically, the first outer iron cores 131 are disposed in a rib form. That is, a spacing is formed between adjacent first outer iron cores 131. The plurality of first outer iron cores 131 are disposed in an annular array distribution centered on the center of circle of the first circle, so that eddy currents can be reduced, thereby improving the flow rate and efficiency of the electromagnetic pump 100.

Figure 16:
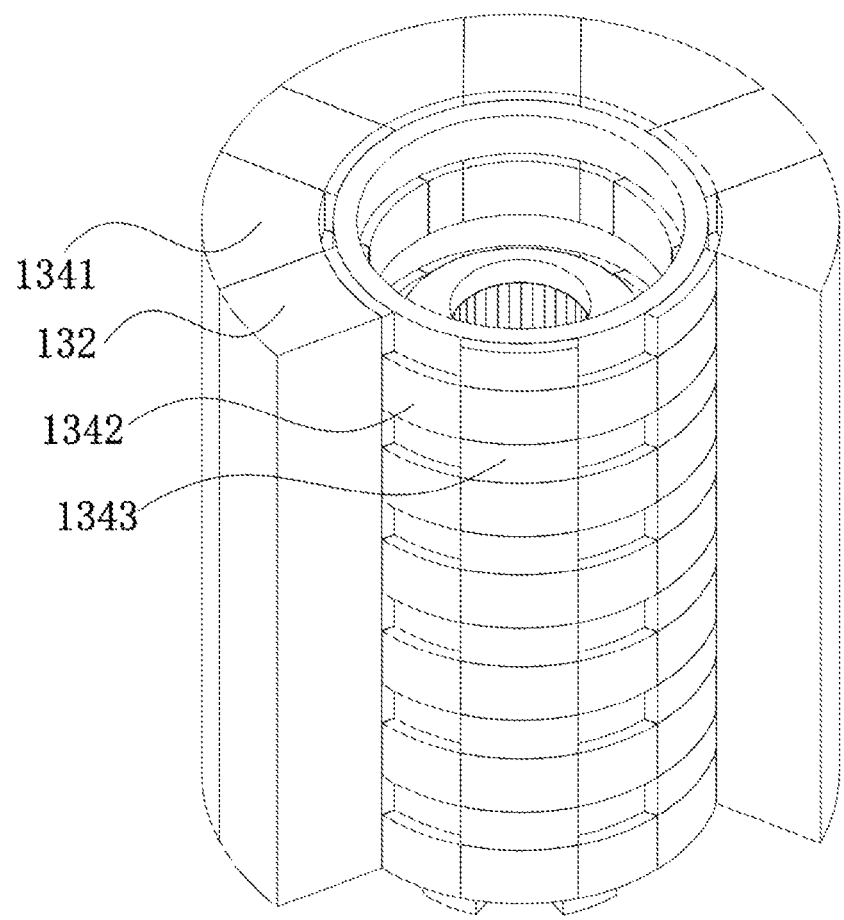
FIG. 16 is a partial schematic structural diagram of a second outer iron core according to the present invention.

As shown in FIG. 15 and FIG. 16, in an embodiment, a plurality of support structures 134 are disposed between the plurality of second outer iron cores 132. The quantity of the support structures 134 is consistent with the quantity of the second outer iron cores 132. That is, one support structure 134 is disposed between two adjacent second outer iron cores 132. The support structures 134 are used for supporting the plurality of second outer iron cores 132, so that the plurality of second outer iron cores 132 do not change under the action of a magnetic pulling force, thereby improving the strength and stability of the electromagnetic pump 100. Specifically, each support structure 134 includes a first support 1341 and a second support 1342. Yokes of the plurality of second outer iron cores 132 are connected by the first supports 1341. That is, the yokes of two adjacent second outer iron cores 132 are connected by one first support 1341. Teeth of the plurality of second outer iron cores 132 are connected by the second supports 1342. That is, the teeth of two adjacent second outer iron cores 132 are connected by one second support 1342. The yoke of each second outer iron core 132 and the tooth of the second outer iron core 132 are integrally formed. The first support 1341 and the second support 1342 may be integrally formed. The first support 1341 may abut against or may be connected to the second support 1342. That is, the first support 1341 and the second support 1342 are disposed in an attached manner. The yokes of the plurality of second outer iron cores 132 and the plurality of first supports 1341 form a first annular body with a cross section being a ring, and the center of circle of the cross section of the first annular body basically coincides with the center of the inner iron core 14. The teeth of the plurality of second outer iron cores 132 and the plurality of second supports 1342 form a second annular body with a cross section being a ring, and the center of circle of the cross section of the second annular body basically coincides with the center of the inner iron core 14. That is, the axis of the first annular body, the axis of the second annular body, and the axis of the electromagnetic pump 100 basically coincide. Through the foregoing arrangement, the concentricity of the electromagnetic pump 100 can be implemented, so that a possibility that single-sided magnetic pressure occurs can be effectively reduced, thereby improving the stability of the electromagnetic pump 100. In this embodiment, the first annular body is disposed surrounding the second annular body. That is, the second annular body is disposed in the first annular body. The first annular body and the second annular body basically form one basically sealed annular body. The first supports 1341 and the second supports 1342 may both be made of stainless steel, so that the rigidity of the second outer iron cores 132 is improved, thereby improving the rigidity of the electromagnetic pump 100. The thickness of the first supports 1341 and the second supports 1342 may be a first thickness. The first thickness may be adjusted according to an actual requirement, so that an arrangement space of the winding 12 on the second outer iron cores 132 can be ensured. The first thickness refers to a length of the first supports 1341 and the second supports 1342 in the axial direction of the electromagnetic pump 100. Through the foregoing arrangement, the plurality of second outer iron cores 132 form one whole through the support structures 134, to increase a heat dissipation area of the second outer iron cores 132, thereby improving the heat dissipation efficiency of the second outer iron cores 132. In addition, through the foregoing arrangement, the problems of loss and heat generation can be mitigated, thereby improving the heat dissipation efficiency of the electromagnetic pump 100.

In this embodiment, the support structure 134 further includes a third support 1343. The third support 1343 is disposed between two adjacent teeth of the plurality of second outer iron cores 132 in the axial direction of the electromagnetic pump 100. The thickness of the third support 1343 is a second thickness. The second thickness may be adjusted according to an actual requirement. During the operation of the electromagnetic pump 100, an axial force is generated, which may cause the teeth of the plurality of second outer iron cores 132 to deform. As a result, the service life of the electromagnetic pump 100 is shortened, and the safety of the electromagnetic pump 100 is reduced. The third supports 1343 may be used for supporting the teeth of the plurality of second outer iron cores 132, to reduce the impact of the axial force on the teeth of the plurality of second outer iron cores 132, thereby improving the service life and the safety of the electromagnetic pump 100. That is, the third supports 1343 are used for canceling out the axial force on the teeth of the plurality of second outer iron cores 132. The third supports 1343 may be made of stainless steel, so that the rigidity of the second outer iron cores 132 is improved, thereby improving the rigidity of the electromagnetic pump 100.

As shown in FIG. 17 and FIG. 18, in an embodiment, a plurality of third outer iron cores 133 are provided. Each third outer iron core 133 includes a yoke ring 1331 and a tooth yoke ring 1332. The yoke rings 1331 and the tooth yoke rings 1332 are disposed stacking each other. That is, the tooth yoke ring 1332 is disposed between two adjacent yoke rings 1331, and the yoke ring 1331 is disposed between two adjacent tooth yoke rings 1332. Specifically, the tooth yoke ring 1332 includes a plurality of second laminates 1332a. That is, the plurality of second laminates 1332a are stacked to form the tooth yoke ring 1332. The adjacent second laminates 1332a may be bonded and fixed by an adhesive or may be fixedly connected in another manner. The second laminates 1332a may be silicon steel sheets. The yoke rings 1331 may be made of silicon steel. In this embodiment, the yoke ring 1331 is basically an annular body, and the tooth yoke ring 1332 is also basically an annular body. An outer diameter of the tooth yoke ring 1332 is basically consistent with an outer diameter of the yoke ring 1331. An inner diameter of the tooth yoke ring 1332 is less than an inner diameter of the yoke ring 1331, so that the tooth yoke rings 1332 form a placement space for placing the winding 12, to facilitate the arrangement of the winding 12.

In this embodiment, when magnetic flux passes through the yoke ring 1331, most magnetic paths are in an axial direction. In the form of axial laminates, the axial magnetoresistance is increased. Therefore, an overall structure is used for the yoke ring 1331, to reduce the magnetoresistance when magnetic flux passes through yokes of the third outer iron cores 133, to facilitate the distribution of a magnetic field. Magnetic flux is basically in a radial direction in magnetic paths of the tooth yoke rings 1332. Therefore, when the axial second laminates 1332a are used for the tooth yoke rings 1332, no excessive impact is caused to the radial magnetoresistance. In addition, through the foregoing arrangement, eddy currents can only be limited to flow in a circumferential direction on a second laminate 1332a, thereby reducing the amount of a current flowing in the circumferential direction.

In this embodiment, each third outer iron core 133 further includes a partitioning layer 1333. The partitioning layer 1333 basically extends in the axial direction of the electromagnetic pump 100. Specifically, the partitioning layer 1333 is at least partially disposed in the tooth yoke rings 1332 and is at least partially disposed in the yoke rings 1331. When the partitioning layer 1333 is at least partially disposed in the tooth yoke rings 1332, a length of the partitioning layer 1333 in the radial direction of the electromagnetic pump 100 is a first length, a length of the tooth yoke ring 1332 in the radial direction of the electromagnetic pump 100 is a second length, and the first length and the second length are basically consistent. When the partitioning layer 1333 is at least partially disposed in the yoke rings 1331, a length of the partitioning layer 1333 in the radial direction of the electromagnetic pump 100 is a third length, a length of the yoke ring 1331 in the radial direction of the electromagnetic pump 100 is a fourth length, and the third length and the fourth length are basically consistent. The partitioning layer 1333 may be made of a magnetically conductive, electrically non-conductive material, that is, an insulating magnetically conductive material, for example, ferrite, and it is also ensured that a magnetic field is uniform in a circumferential direction, to prevent a fluid from circulation.

Figure 19:
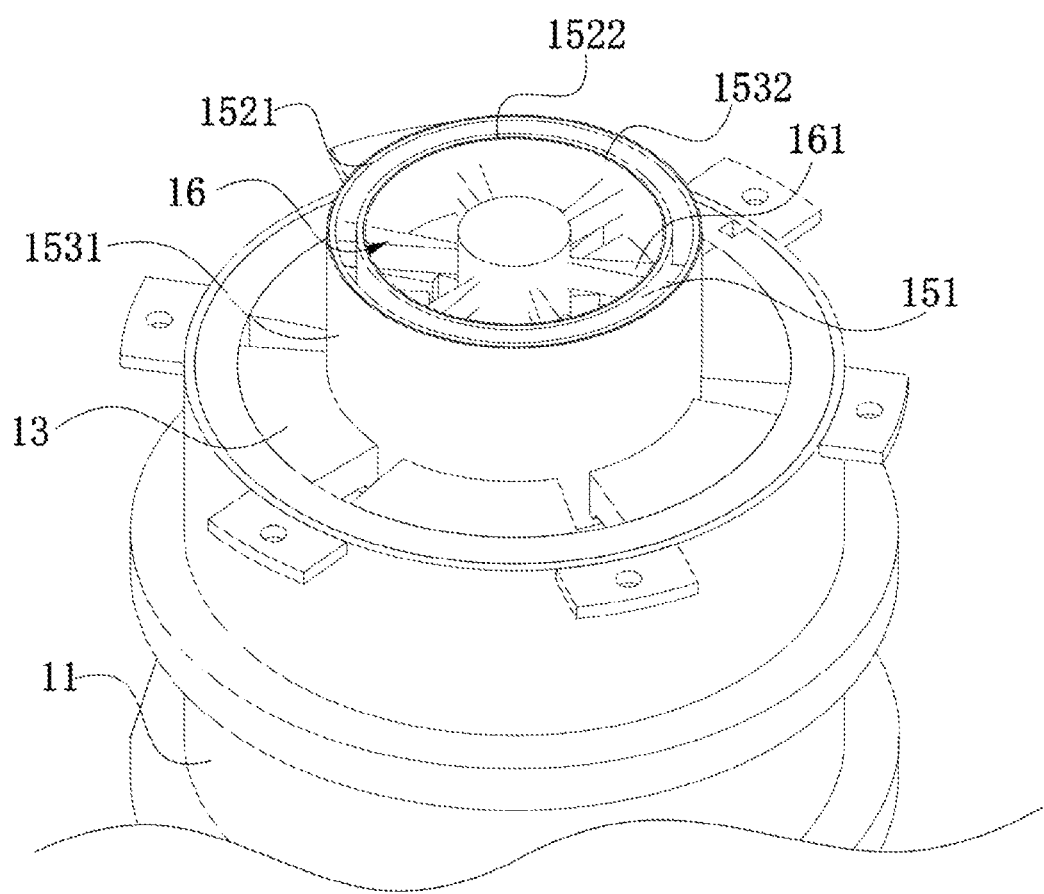
FIG. 19 is a schematic structural diagram of a first support member according to the present invention.
Figure 20:
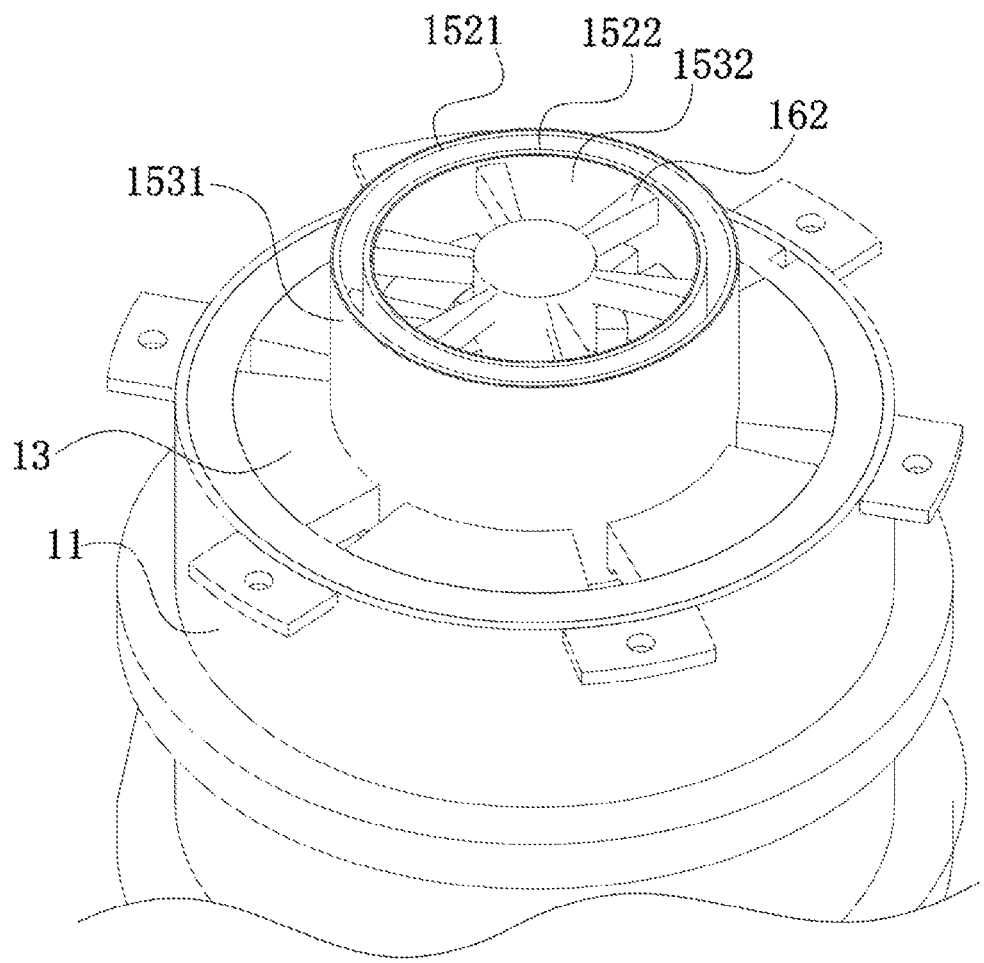
FIG. 20 is a schematic structural diagram of a second support member according to the present invention.
Figure 21:
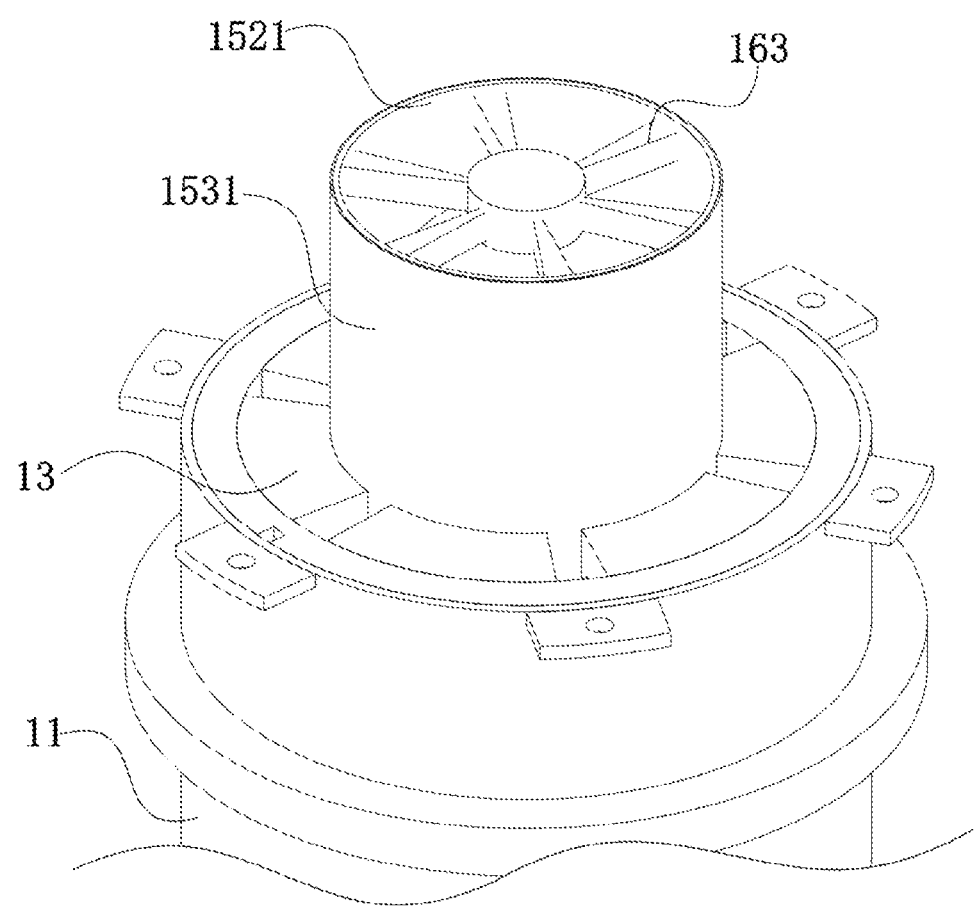
FIG. 21 is a schematic structural diagram of a third support member according to the present invention.

As shown in FIG. 19 to FIG. 21, in an embodiment, the electromagnetic pump 100 further includes a support assembly 16. The support assembly 16 is used for supporting the pump channel wall 152 or the protective layer 153, thereby improving the stability of the circulation channel 151. The support assembly 16 may be made of ceramic. One end of the support assembly 16 is connected to or abuts against the central cylinder, and the other end of the support assembly 16 is connected to or abuts against the pump channel wall 152 or the protective layer 153. The support assembly 16 is basically disposed surrounding the central cylinder, and the support assembly 16 is basically in a rib form. Through the foregoing arrangement, the support assembly 16 may be directly connected to or abut against the central cylinder, and the support assembly 16 is connected to or abuts against the pump channel wall 152 or the protective layer 153, so that the pump channel wall 152 or the protective layer 153 is subjected to a reduced force, to improve the stability of the circulation channel 151, thereby improving the stability of the electromagnetic pump 100. It may be understood that the support assembly 16 may be integrally formed with the central cylinder or may be connected to the central cylinder in a connection manner in another form. The support assembly 16 may be fixedly connected to the pump channel wall 152 or the protective layer 153 or may abut against the pump channel wall 152 or the protective layer 153, and it is only necessary to implement the support of the support assembly 16.

In this embodiment, the support assembly 16 may be a first support member 161 or a second support member 162 or a third support member 163.

As shown in FIG. 19, in an embodiment, one end of the first support member 161 is connected to the central cylinder, and the other end of the first support member 161 sequentially passes through the second protective layer 1532 and the second pump channel wall 1522 and is connected to or abuts against the first pump channel wall 1521. The first support member 161 is basically disposed surrounding the central cylinder, and the first support member 161 is basically in a rib form. Through the foregoing arrangement, the first support member 161 may be directly connected to or abut against the central cylinder, and the first support member 161 is connected to or abuts against the first pump channel wall 1521, so that the second pump channel wall 1522 is subjected to a reduced force, and the strength of the first pump channel wall 1521 is improved, to improve the stability of the circulation channel 151, thereby improving the stability of the electromagnetic pump 100. It may be understood that the first support member 161 may be integrally formed with the central cylinder or may be connected to the central cylinder in a connection manner in another form. The first support member 161 may be connected to the first pump channel wall 1521 or may abut against the first pump channel wall 1521.

Specifically, the quantity of the first support members 161 may be adjusted according to an actual requirement. Specifically, a plurality of second through holes are provided in the second protective layer 1532, and the plurality of second through holes are basically provided surrounding the second protective layer 1532. A plurality of third through holes are provided in the second pump channel wall 1522, and the plurality of third through holes are basically provided surrounding the second pump channel wall 1522. The quantity of the second through holes, the quantity of the third through holes, and the quantity of the first support members 161 are consistent. The positions of the second through holes and the positions of the third through holes are basically consistent, to make it convenient for an end of the first support member 161 away from the central cylinder to pass through the second through holes and the third through holes to be connected to or abut against the first pump channel wall 1521. In this embodiment, the first support member 161 and the second through holes are in interference fit, and the first support member 161 and the third through holes are in interference fit, to prevent liquid metal in the circulation channel 151 from leaking through the second through holes and/or the third through holes, thereby improving the stability of the electromagnetic pump 100. The first support member 161 may be made of ceramic.

In this embodiment, an end surface of an end of the first support member 161 connected to the central cylinder is an arc surface. End surfaces of ends of the plurality of first support members 161 connected to the central cylinder basically form one cylindrical space, so that the plurality of first support members 161 may be attached to the central cylinder more tightly, thereby improving the stable connection between the first support member 161 and the central cylinder. An end surface of an end of the first support member 161 connected to or abutting against the first pump channel wall 1521 is an arc surface. End surfaces of ends of the plurality of first support members 161 connected to or abutting against the first pump channel wall 1521 basically form one cylindrical space, so that the plurality of first support members 161 may be attached to the first pump channel wall 1521 more tightly, to improve the stable connection or abutting between the first support members 161 and the first pump channel wall 1521, thereby improving the support of the first support members 161.

In this embodiment, the pump channel wall 152 and the protective layer 153 both extend in the axial direction of the electromagnetic pump 100, and extension lengths of the pump channel wall 152 and the protective layer 153 are basically consistent. The plurality of second through holes are provided in an extended part of the second protective layer 1532, the plurality of third through holes are provided in an extended part of the second pump channel wall 1522, and the first support member 161 passes through the second through holes and the third through holes to be connected to or abut against an extended part of the first pump channel wall 1521.

It may be understood that the pump channel wall 152 may extend in the axial direction of the electromagnetic pump 100. However, the protective layer 153 may not extend in the axial direction of the electromagnetic pump 100. In this case, the plurality of second through holes are not provided in the second protective layer 1532. The plurality of third through holes are provided in an extended part of the second pump channel wall 1522, and the first support member 161 passes through the third through holes to be connected to or abut against an extended part of the first pump channel wall 1521.

It may be understood that the pump channel wall 152 and the first protective layer 1531 may both extend in the axial direction of the electromagnetic pump 100, and extension lengths of the pump channel wall 152 and the first protective layer 1531 are basically consistent. However, the second protective layer 1532 may not extend in the axial direction of the electromagnetic pump 100. In this case, the plurality of second through holes are not provided in the second protective layer 1532. The plurality of third through holes are provided in an extended part of the second pump channel wall 1522, and the first support member 161 passes through the third through holes to be connected to or abut against an extended part of the first pump channel wall 1521.

It may be understood that the pump channel wall 152 and the second protective layer 1532 may both extend in the axial direction of the electromagnetic pump 100, and extension lengths of the pump channel wall 152 and the second protective layer 1532 are basically consistent. However, the first protective layer 1531 may not extend in the axial direction of the electromagnetic pump 100. In this case, the plurality of second through holes are provided in an extended part of the second protective layer 1532, the plurality of third through holes are provided in an extended part of the second pump channel wall 1522, and the first support member 161 passes through the second through holes and the third through holes to be connected to or abut against an extended part of the first pump channel wall 1521.

As shown in FIG. 20, in an embodiment, one end of the second support member 162 is connected to the central cylinder, and the other end of the second support member 162 is connected to or abuts against the second protective layer 1532. The second support member 162 is basically disposed surrounding the central cylinder, and the second support member 162 is basically in a rib form. Through the foregoing arrangement, the second support member 162 may be directly connected to or abut against the central cylinder, and the second support member 162 is connected to or abuts against the second protective layer 1532, so that the second pump channel wall 1522 and the second protective layer 1532 are subjected to a reduced force, and the strength of the second pump channel wall 1522 and the second protective layer 1532 is improved, to improve the stability of the circulation channel 151, thereby improving the stability of the electromagnetic pump 100. It may be understood that the second support member 162 may be integrally formed with the central cylinder or may be connected to the central cylinder in a connection manner in another form. The second support member 162 may be connected to the second protective layer 1532 or may abut against the second protective layer 1532.

Specifically, the quantity of the second support members 162 may be adjusted according to an actual requirement. The second support member 162 may be made of ceramic.

In this embodiment, an end surface of an end of the second support member 162 connected to the central cylinder is an arc surface. End surfaces of ends of the plurality of second support members 162 connected to the central cylinder basically form one cylindrical space, so that the plurality of second support members 162 may be attached to the central cylinder more tightly, thereby improving the stable connection between the second support member 162 and the central cylinder. An end surface of an end of the second support member 162 connected to or abutting against the second protective layer 1532 is an arc surface. End surfaces of ends of the plurality of second support members 162 connected to or abutting against the second protective layer 1532 basically form one cylindrical space, so that the plurality of second support members 162 may be attached to the second protective layer 1532 more tightly, to improve the stable connection or abutting between the second support members 162 and the second protective layer 1532, thereby improving the support of the second support members 162.

In this embodiment, the pump channel wall 152 and the protective layer 153 both extend in the axial direction of the electromagnetic pump 100, and extension lengths of the pump channel wall 152 and the protective layer 153 are basically consistent. The second support members 162 are connected to or abut against the extended part of the second protective layer 1532. Specifically, the second protective layer 1532 and the second pump channel wall 1522 both extend in the axial direction of the electromagnetic pump 100, and extension lengths of the second protective layer 1532 and the second pump channel wall 1522 are basically consistent. The first protective layer 1531 and the first pump channel wall 1521 may both extend in the axial direction of the electromagnetic pump 100, and the extension lengths of the first protective layer 1531, the first pump channel wall 1521, the second protective layer 1532, and the second pump channel wall 1522 are basically consistent. Alternatively, the extension lengths of the first protective layer 1531 and the first pump channel wall 1521 are basically consistent, and the extension length of the first protective layer 1531 is less than the extension length of the second protective layer 1532.

It may be understood that the second protective layer 1532 and the second pump channel wall 1522 extend in the axial direction of the electromagnetic pump 100, and the extension lengths of the second protective layer 1532 and the second pump channel wall 1522 are basically consistent. However, the first protective layer 1531 and the first pump channel wall 1521 may not extend in the axial direction of the electromagnetic pump 100.

It may be understood that the second protective layer 1532 and the pump channel wall 152 both extend in the axial direction of the electromagnetic pump 100, and extension lengths of the second protective layer 1532 and the pump channel wall 152 are basically consistent. However, the first protective layer 1531 may not extend in the axial direction of the electromagnetic pump 100.

It may be understood that the first protective layer 1531 and the pump channel wall 152 may both extend in the axial direction of the electromagnetic pump 100, and extension lengths of the first protective layer 1531 and the pump channel wall 152 are basically consistent. However, the second protective layer 1532 may not extend in the axial direction of the electromagnetic pump 100. In this case, the second support members 162 are connected to or abut against the extended part of the second pump channel wall 1522.

It may be understood that the pump channel wall 152 extends in the axial direction of the electromagnetic pump 100. However, the protective layer 153 may not extend in the axial direction of the electromagnetic pump 100. In this case, the second support members 162 are connected to or abut against the extended part of the second pump channel wall 1522.

In summary, the second pump channel wall 1522 needs to extend in the axial direction of the electromagnetic pump 100, and the first pump channel wall 1521 and/or the first protective layer 1531 and/or the second protective layer 1532 may not extend in the axial direction of the electromagnetic pump 100. In addition, when the second protective layer 1532 does not extend in the axial direction of the electromagnetic pump 100, the second support members 162 are connected to or abut against the extended part of the second pump channel wall 1522. When the second protective layer 1532 extends in the axial direction of the electromagnetic pump 100, the second support members 162 are connected to or abut against the extended part of the second protective layer 1532.

As shown in FIG. 21, in an embodiment, one end of the third support member 163 is connected to the central cylinder, and the other end of the third support member 163 is connected to or abuts against the first pump channel wall 1521. The third support member 163 is basically disposed surrounding the central cylinder, and the third support member 163 is basically in a rib form. Through the foregoing arrangement, the third support member 163 may be directly connected to or abut against the central cylinder, and the third support member 163 is connected to or abuts against the first pump channel wall 1521, so that the first pump channel wall 1521 and the first protective layer 1531 are subjected to a reduced force, and the strength of the first pump channel wall 1521 and the first protective layer 1531 is improved, to improve the stability of the circulation channel 151, thereby improving the stability of the electromagnetic pump 100. It may be understood that the third support member 163 may be integrally formed with the central cylinder or may be connected to the central cylinder in a connection manner in another form. The third support member 163 may be connected to the first pump channel wall 1521 or may abut against the first pump channel wall 1521.

Specifically, the quantity of the third support members 163 may be adjusted according to an actual requirement. The third support member 163 may be made of ceramic.

In this embodiment, an end surface of an end of the third support member 163 connected to the central cylinder is an arc surface. End surfaces of ends of the plurality of third support members 163 connected to the central cylinder basically form one cylindrical space, so that the plurality of third support members 163 may be attached to the central cylinder more tightly, thereby improving the stable connection between the third support member 163 and the central cylinder. An end surface of an end of the third support member 163 connected to or abutting against the first pump channel wall 1521 is an arc surface. End surfaces of ends of the plurality of third support members 163 connected to or abutting against the first pump channel wall 1521 basically form one cylindrical space, so that the plurality of third support members 163 may be attached to the first pump channel wall 1521 more tightly, to improve the stable connection or abutting between the third support members 163 and the first pump channel wall 1521, thereby improving the support of the third support members 163.

In this embodiment, the first pump channel wall 1521 and the first protective layer 1531 both extend in the axial direction of the electromagnetic pump 100, and extension lengths of the first pump channel wall 1521 and the first protective layer 1531 are basically consistent. The third support members 163 are connected to or abut against the extended part of the first pump channel wall 1521.

It may be understood that the first pump channel wall 1521 extends in the axial direction of the electromagnetic pump 100, and the first pump channel wall 1521 and/or the first protective layer 1531 and/or the second protective layer 1532 may not extend in the axial direction of the electromagnetic pump 100.

In an embodiment, when the outer iron core 13 includes the first outer iron core 131 or the second outer iron core 132, the pump channel mechanism 15 includes the cavity dividing structures 154. That is, when the outer iron core 13 includes the first outer iron core 131 or the second outer iron core 132, the cavity dividing structures 154 is disposed between the first pump channel wall 1521 and the second pump channel wall 1522. When the outer iron core 13 includes the third outer iron core 133, the pump channel mechanism 15 may include the cavity dividing structures 154 or the pump channel mechanism 15 may not include the cavity dividing structures 154. That is, when the outer iron core 13 includes the third outer iron core 133, the cavity dividing structures 154 may be disposed between the first pump channel wall 1521 and the second pump channel wall 1522 or the cavity dividing structures 154 may not be disposed between the first pump channel wall 1521 and the second pump channel wall 1522.

Aspects of the invention include:
1. An electromagnetic pump, comprising:
a pump body, an accommodating space being formed in the pump body;
an inner iron core, the inner iron core being at least partially disposed in the accommodating space and comprising a central cylinder, an axis of the central cylinder basically coinciding with an axis of the electromagnetic pump;
a plurality of outer iron cores, the plurality of outer iron cores being disposed at least partially surrounding the inner iron core;
a winding, the winding being at least partially disposed on the outer iron cores; and
a pump channel mechanism, the pump channel mechanism being at least partially disposed between the outer iron cores and the inner iron core,
wherein
the pump channel mechanism comprises:
a first pump channel wall, the first pump channel wall being disposed between the outer iron cores and the inner iron core;
a second pump channel wall, the second pump channel wall being disposed between the first pump channel wall and the inner iron core;
a second protective layer, the second protective layer being disposed between the second pump channel wall and the inner iron core;
a circulation channel, the circulation channel being disposed between the first pump channel wall and the second pump channel wall; and
a cavity dividing structure, the cavity dividing structure being disposed between the first pump channel wall and the second pump channel wall and being used for supporting the first pump channel wall and the second pump channel wall,
the cavity dividing structure being further used for dividing the circulation channel, to divide the circulation channel into a plurality of channels, the cavity dividing structure comprising a first cavity dividing member and/or a second cavity dividing member and/or a third cavity dividing member, a cross section of the first cavity dividing member being a first cross section, the first cross section being basically a first trapezoid, a length of a longer bottom of the first cross section being $L_1$, $$L_1 > \frac{2\pi(r + d_1 + d_2 + h)}{360} \times 2\theta$$

where in r is a radius of the inner iron core, $d_1$ is a thickness of the second pump channel wall, $d_2$ is a thickness of the second protective layer, h is a width of the circulation channel, $$\theta > \frac{1}{2}\left(\frac{360}{n} - \alpha\right)$$

is a quantity of the cavity dividing structures, and α is a half of a radian corresponding to $L_1$.

2. The electromagnetic pump according to aspect 1, wherein one end of the cavity dividing structure is connected to or abuts against the first pump channel wall, and the other end of the cavity dividing structure is connected to or abuts against the second pump channel wall.

3. The electromagnetic pump according to aspect 2, wherein the pump channel mechanism further comprises a first protective layer, and the first protective layer is disposed between the first pump channel wall and the outer iron cores.

4. The electromagnetic pump according to aspect 3, wherein a length of a shorter bottom of the first cross section is $L_2$, and $$L_2 > \frac{2\pi(r + d_1 + d_2)}{360} \times 2\theta.$$

5. The electromagnetic pump according to aspect 3, wherein a cross section of the second cavity dividing member is a second cross section, the second cross section is basically a rectangle, a side length by which the second cross section is connected to or abuts against the first pump channel wall is $L_1$, and a side length by which the second cross section is connected to or abuts against the second pump channel wall is also $L_1$.

6. The electromagnetic pump according to aspect 4, wherein a cross section of the third cavity dividing member is a third cross section, the third cross section is basically formed by splicing two second trapezoids, shorter bottoms of the two second trapezoids are spliced, a longer side of one second trapezoid is connected to or abuts against the first pump channel wall, and a longer side of the other second trapezoid is connected to or abuts against the second pump channel wall.

7. The electromagnetic pump according to aspect 6, wherein a length of the longer bottom of each second trapezoid is $L_1$, a length of the shorter bottom of each second trapezoid is $L_3$, and $$L_3 > \frac{2\pi(r + d_1 + d_2 + 0.5h)}{360} \times 2\theta.$$

8. The electromagnetic pump according to aspect 1, wherein in a case that the electromagnetic pump has been continuously operating for 30 days, a mass change of the cavity dividing structure is less than or equal to 0.05%; and at a temperature of 500° C., a volume change of the cavity dividing structure is less than or equal to 1%.

9. The electromagnetic pump according to aspect 1, wherein the cavity dividing structure is made of a molybdenum alloy.

10. The electromagnetic pump according to aspect 1, wherein the pump channel mechanism at least partially extends in an axial direction of the electromagnetic pump; and
the electromagnetic pump further comprises a support assembly, one end of the support assembly is connected to or abuts against the central cylinder, and the other end of the support assembly is connected to or abuts against an extended part of the pump channel mechanism.

11. The electromagnetic pump according to aspect 10, wherein the pump channel mechanism further comprises a first protective layer and the second protective layer, and the first protective layer, the first pump channel wall, the second pump channel wall, and the second protective layer are arranged from outside to inside.

12. The electromagnetic pump according to aspect 10, wherein the support assembly is made of ceramic.

13. The electromagnetic pump according to aspect 11, wherein the support assembly comprises a first support member, one end of the first support member is connected to or abuts against the central cylinder, and the other end of the first support member passes through the second protective layer and the second pump channel wall to be connected to or abut against the first pump channel wall.

14. The electromagnetic pump according to aspect 13, wherein the first support member is basically disposed surrounding the central cylinder.

15. The electromagnetic pump according to aspect 13, wherein a plurality of second through holes are provided in the second protective layer, a plurality of third through holes are provided in the second pump channel wall, and one end of the first support member passes through the second through holes and the third through holes to be connected to or abut against the first pump channel wall.

16. The electromagnetic pump according to aspect 15, wherein a quantity of the second through holes, a quantity of the third through holes, and a quantity of the first support members are consistent; and positions of the second through holes and positions of the third through holes are basically consistent.

17. The electromagnetic pump according to aspect 15, wherein the first support member and the second through holes are in interference fit, and the first support member and the third through holes are in interference fit.

18. The electromagnetic pump according to aspect 13, wherein the first pump channel wall and the second pump channel wall extend in the axial direction of the electromagnetic pump, and the first protective layer and/or the second protective layer extends in the axial direction of the electromagnetic pump.

19. The electromagnetic pump according to aspect 13, wherein the first pump channel wall and the second pump channel wall extend in the axial direction of the electromagnetic pump.

20. The electromagnetic pump according to aspect 11, wherein the support assembly further comprises a second support member, one end of the second support member is connected to or abuts against the central cylinder, and the other end of the second support member is connected to or abuts against the second protective layer.

21. The electromagnetic pump according to aspect 20, wherein the second support member is basically disposed surrounding the central cylinder.

22. The electromagnetic pump according to aspect 20, wherein the second pump channel wall extends in the axial direction of the electromagnetic pump, and the first pump channel wall and/or the first protective layer and/or the second protective layer extends in the axial direction of the electromagnetic pump.

23. The electromagnetic pump according to aspect 20, wherein the second pump channel wall extends in the axial direction of the electromagnetic pump.

24. The electromagnetic pump according to aspect 11, wherein the support assembly further comprises a third support member, one end of the third support member is connected to or abuts against the central cylinder, and the other end of the third support member is connected to or abuts against the first pump channel wall.

25. The electromagnetic pump according to aspect 24, wherein the third support member is basically disposed surrounding the central cylinder.

26. The electromagnetic pump according to aspect 24, wherein the first pump channel wall and the first protective layer both extend in the axial direction of the electromagnetic pump.

27. The electromagnetic pump according to aspect 24, wherein the first pump channel wall extends in the axial direction of the electromagnetic pump It should be understood that a person of ordinary skill in the art may make improvements or modifications according to the foregoing description and all of the improvements and modifications should all fall within the protection scope of the attached claims of the present invention.

The invention claimed is:

1. An electromagnetic pump, comprising:
a pump body, an accommodating space being formed in the pump body;
an inner iron core, the inner iron core being at least partially disposed in the accommodating space and comprising a central cylinder, an axis of the central cylinder substantially coinciding with an axis of the electromagnetic pump;
a plurality of outer iron cores, the plurality of outer iron cores being disposed at least partially surrounding the inner iron core;
a winding, the winding being at least partially disposed on the outer iron cores; and
a pump channel mechanism, the pump channel mechanism being at least partially disposed between the outer iron cores and the inner iron core, wherein
the pump channel mechanism comprises:
a first pump channel wall, the first pump channel wall being disposed between the outer iron cores and the inner iron core;
a second pump channel wall, the second pump channel wall being disposed between the first pump channel wall and the inner iron core;
a first protective layer, the first protective layer is disposed between the first pump channel wall and the outer iron cores;
a second protective layer, the second protective layer being disposed between the second pump channel wall and the inner iron core;
a circulation channel, the circulation channel being disposed between the first pump channel wall and the second pump channel wall; and
a cavity dividing structure, the cavity dividing structure being disposed between the first pump channel wall and the second pump channel wall and being used for supporting the first pump channel wall and the second pump channel wall,
the cavity dividing structure being further used for dividing the circulation channel, to divide the circulation channel into a plurality of channels, the cavity dividing structure comprising a first cavity dividing member and/or a second cavity dividing member and/or a third cavity dividing member, a cross section of the first cavity dividing member being a first cross section, the first cross section being substantially a first trapezoid, a length of a longer edge of the first cross section being $L_1$, $$L_1 > \frac{2\pi(r + d_1 + d_2 + H)}{360} \times 2\theta$$

where in r is a radius of the inner iron core, $d_1$ is a thickness of the second pump channel wall, $d_2$ is a thickness of the second protective layer, h is a width of the circulation channel, $$\theta > \frac{1}{2}\left(\frac{360}{n} - \alpha\right)$$

where n is the number of cavity dividing structures, and $\alpha$ is a half of the angle subtended by the ends of $L_1$ at the axis of the central cylinder.

2. The electromagnetic pump according to claim 1, wherein the cavity dividing structure is connected to or abuts against the first and second pump channel walls, and the longer edge of the substantially trapezoid shaped cavity dividing structure is connected to or abuts against the first pump channel wall.

3. The electromagnetic pump according to claim 1, wherein a length of a shorter bottom of the first cross section is $L_2$, and $$L_2 > \frac{2\pi(r + d_1 + d_2)}{360} \times 2\theta.$$

4. The electromagnetic pump according to claim 1, wherein a cross section of the second cavity dividing member is a second cross section, the second cross section is substantially a rectangle, a side length by which the second cross section is connected to or abuts against the first pump channel wall is $L_1$, and a side length by which the second cross section is connected to or abuts against the second pump channel wall is also $L_1$.

5. The electromagnetic pump according to claim 1, wherein a cross section of the third cavity dividing member is a third cross section, the third cross section is substantially formed by splicing two second trapezoids, shorter bottoms of the two second trapezoids are spliced, a longer side of one second trapezoid is connected to or abuts against the first pump channel wall, and a longer side of the other second trapezoid is connected to or abuts against the second pump channel wall.

6. The electromagnetic pump according to claim 5, wherein a length of the longer side of each second trapezoid is $L_1$, a length of the shorter bottom of each second trapezoid is $L_3$, and $$L_3 > \frac{2\pi(r + d_1 + d_2 + 0.5h)}{360} \times 2\theta.$$

where h is the width of the circulation channel.

7. The electromagnetic pump according to claim 1, wherein in a case that the electromagnetic pump has been continuously operating for 30 days, a mass change of the cavity dividing structure is less than or equal to 0.05%; and at a temperature of 500° C., a volume change of the cavity dividing structure is less than or equal to 1%; the cavity dividing structure is made of a molybdenum alloy.

8. The electromagnetic pump according to claim 1, wherein the pump channel mechanism at least partially extends in an axial direction of the electromagnetic pump; and the electromagnetic pump further comprises a support assembly, one end of the support assembly is connected to or abuts against the central cylinder, and the other end of the support assembly is connected to or abuts against an extended part of the pump channel mechanism;

the support assembly is made of ceramic.

9. The electromagnetic pump according to claim 8, wherein the support assembly comprises a first support member, one end of the first support member is connected to or abuts against the central cylinder, and the other end of the first support member passes through the second protective layer and the second pump channel wall to be connected to or abut against the first pump channel wall; the first support member is substantially disposed around the central cylinder.

10. The electromagnetic pump according to claim 9, wherein a plurality of second through holes are provided in the second protective layer, a plurality of third through holes are provided in the second pump channel wall, and one end of the first support member passes through the second through holes and the third through holes to be connected to or abut against the first pump channel wall.

11. The electromagnetic pump according to claim 10, wherein a quantity of the second through holes, a quantity of the third through holes, and a quantity of the first support members are positioned in alignment; and the first support member and the second through holes are in interference fit, and the first support member and the third through holes are in interference fit.

12. The electromagnetic pump according to claim 9, wherein the first pump channel wall and the second pump channel wall extend in the axial direction of the electromagnetic pump, and the first protective layer and/or the second protective layer extends in the axial direction of the electromagnetic pump.

13. The electromagnetic pump according to claim 9, wherein the first pump channel wall and the second pump channel wall extend in the axial direction of the electromagnetic pump.

14. The electromagnetic pump according to claim 8, wherein the support assembly further comprises a second support member, one end of the second support member is connected to or abuts against the central cylinder, and the other end of the second support member is connected to or abuts against the second protective layer;

the second support member is substantially disposed around the central cylinder.

15. The electromagnetic pump according to claim 14, wherein the second pump channel wall extends in the axial direction of the electromagnetic pump, and the first pump channel wall and/or the first protective layer and/or the second protective layer extends in the axial direction of the electromagnetic pump.

16. The electromagnetic pump according to claim 14, wherein the second pump channel wall extends in the axial direction of the electromagnetic pump.

17. The electromagnetic pump according to claim 8, wherein the support assembly further comprises a third support member, one end of the third support member is connected to or abuts against the central cylinder, and the other end of the third support member is connected to or abuts against the first pump channel wall.

18. The electromagnetic pump according to claim 17, wherein the third support member is substantially disposed around the central cylinder.

19. The electromagnetic pump according to claim 17, wherein the first pump channel wall and the first protective layer both extend in the axial direction of the electromagnetic pump.

20. The electromagnetic pump according to claim 17, wherein the first pump channel wall extends in the axial direction of the electromagnetic pump.

* * * * *